US008060572B2

(12) United States Patent
Brown et al.

(10) Patent No.: US 8,060,572 B2
(45) Date of Patent: Nov. 15, 2011

(54) SUBSCRIPTION MANAGEMENT FOR A CONTENT-BASED PRESENCE SERVICE

(75) Inventors: Robert William Brown, Arnprior (CA); Bruce Eric Buffam, Woodlawn (CA); Connor Patrick O'Rourke, Kanata (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/619,013

(22) Filed: Nov. 16, 2009

(65) Prior Publication Data

US 2010/0217615 A1      Aug. 26, 2010

Related U.S. Application Data

(60) Provisional application No. 61/155,017, filed on Feb. 24, 2009.

(51) Int. Cl.
G06F 15/16       (2006.01)
G06F 15/173     (2006.01)
(52) U.S. Cl. .................. 709/206; 709/223; 709/224
(58) Field of Classification Search .............. 709/206, 709/204, 223–224
See application file for complete search history.

(56) References Cited

U.S. PATENT DOCUMENTS

| 6,016,478 | A  | * | 1/2000  | Zhang et al. ............. 705/9 |
| 6,327,533 | B1 | * | 12/2001 | Chou .................... 701/207 |
| 6,442,263 | B1 | * | 8/2002  | Beaton et al. ......... 379/142.04 |
| 6,542,075 | B2 | * | 4/2003  | Barker et al. ............ 340/506 |
| 6,587,835 | B1 | * | 7/2003  | Treyz et al. ............. 705/14.64 |
| 6,716,101 | B1 | * | 4/2004  | Meadows et al. ......... 455/456.1 |
| 7,284,033 | B2 | * | 10/2007 | Jhanji ..................... 709/206 |
| 2002/0087892 | A1 |  | 7/2002  | Imazu |
| 2003/0037103 | A1 |  | 2/2003  | Salmi et al. |
| 2004/0267625 | A1 |  | 12/2004 | Feng et al. |
| 2005/0021773 | A1 |  | 1/2005  | Shiga et al. |
| 2007/0136197 | A1 |  | 6/2007  | Morris |
| 2007/0182541 | A1 |  | 8/2007  | Harris et al. |
| 2008/0028211 | A1 |  | 1/2008  | Tanizawa |
| 2008/0089488 | A1 |  | 4/2008  | Brunson et al. |
| 2008/0108332 | A1 |  | 5/2008  | Tian et al. |
| 2008/0205655 | A1 |  | 8/2008  | Wilkins et al. |
| 2008/0208953 | A1 |  | 8/2008  | Tian |

(Continued)

FOREIGN PATENT DOCUMENTS

EP    1 753 199 A1    2/2007

(Continued)

OTHER PUBLICATIONS

"Content-Based Routing for Publish-Subscribe on a Dynamic Topology: Concepts, Protocols, and Evaluation" Gianpaolo Cugola, Davide Frey, Amy L. Murphy, Gian Pietro Picco.

(Continued)

*Primary Examiner* — Hussein Elchanti
(74) *Attorney, Agent, or Firm* — Jones Day

(57) ABSTRACT

A method for managing a subscription to content-based presence information entails receiving a subscription-suspension message from a device at a presence service, identifying the subscription associated with the subscription-suspension message, suspending the subscription, and sending a response from the presence service to the device to notify the device that the subscription has been suspended. Suspending the subscription may involve accumulating notifications in a persistent data store. The method may further involve receiving a subscription-resumption message at the presence service to resume the subscription that was suspended.

12 Claims, 38 Drawing Sheets

U.S. PATENT DOCUMENTS

| | | | |
|---|---|---|---|
| 2009/0010163 | A1 | 1/2009 | Isomura et al. |
| 2009/0022286 | A1 | 1/2009 | Brunson et al. |
| 2009/0022287 | A1 | 1/2009 | Brunson et al. |
| 2009/0022288 | A1 | 1/2009 | Brunson et al. |
| 2009/0022289 | A1 | 1/2009 | Brunson et al. |
| 2009/0028303 | A1 | 1/2009 | Brunson et al. |
| 2009/0049190 | A1 | 2/2009 | Jiang et al. |
| 2009/0063643 | A1 | 3/2009 | Setiawan et al. |
| 2009/0063676 | A1 | 3/2009 | Oh et al. |
| 2009/0066510 | A1 | 3/2009 | Kamdar et al. |
| 2009/0070410 | A1 | 3/2009 | Gilfix et al. |
| 2009/0070419 | A1 | 3/2009 | Gilfix et al. |
| 2009/0077584 | A1 | 3/2009 | Glasgow et al. |

FOREIGN PATENT DOCUMENTS

| | | |
|---|---|---|
| WO | 02/25403 A2 | 3/2002 |
| WO | 2006072817 A1 | 7/2006 |
| WO | 2007061946 A2 | 5/2007 |
| WO | 2008/020705 A1 | 2/2008 |
| WO | 2008073009 A1 | 6/2008 |
| WO | 2008/120901 A1 | 10/2008 |
| WO | 2008/152586 A2 | 12/2008 |

OTHER PUBLICATIONS

"Efficient Content-Based Event Dispatching in the Presence of Topological Reconfiguration" Gianpaolo Cugola, Amy L. Murphy (2003) In Proceedings of the 23rd International Conference on Distributed Computing Systems (ICDCS03).

"Semi-Probabilistic Content-Based Publish-Subscribe" Paolo Costa, Gian Pietro Picco (2005) In Proceedings of the 25th International Conference on Distributed Computing Systems (ICDCS05).

"Bloom Filter Based Routing for Content-Based Publish/Subscribe" Zbigniew Jerzak et al. (2008) In Proceedings of the 2nd International Conference no Distributed Event-Based Systems—Rome, Italy.

"Scalable Security and Accounting Services for content-based Publish/Subscribe Systems" Himanshi Khurana, Radostina Koleva (2005) In Proceedings Symposium on Applied Computing.

"Achieving Scalability and Expressiveness in an Internet-Scale Event Notification Service" Antonio Carzaniga (2000) In Proceedings of the 19th Annual ACM Symposium on Principles of Distributed Computing.

"Content-Based Networking: A New Communication Infrastructure" Antonio Carzaniga, Er L. Wolf (2001) In NSF Workshop on an Infrastructure for Mobile and Wireless Systems.

"Publish/Subscribe Tree Construction in Wireless Ad-Hoc Networks" Yongqiang Huang, Hector Garcia-Molina In 4th International Conference on Mobile Data Management (MDM 2003), vol. 2574 of LNCS.

"Content-Based Dispatching in a Mobile Environment" Gianpaolo Cugola, Elisabetta Di Nitto, Gian Pietro Picco In Proceedings of WSDAAL 2000.

"Minimizing the Reconfiguration Overhead in Content-Based Publish-Subscribe" Gianpaolo Cugola, Davide Frey, Amy L. Murphy, Gian Pietro Picco In Proceedings of the ACM Symposium on Applied Computing (SAC) 2004.

"Modelling the Communication Costs of Content-Based Routing: The Case of Subscription Forwarding" Stefano Castelli, Paolo Costa (2007) In Proceedings of the 1st International Conference on Distributed Event-Based Systems.

"HyperCBR: Large-Scale Content-Based Routing in Multidimensional Space" Stefano Castelli.

"Epidemic Algorithms for Reliable Content-Based Publish-Subscribe: An Evaluation" Paulo Costa, Matted Migliavacca, Gian Pietro Picco, Gianpaolo Cugola (2004) In Proceedings of the 24th International Conference no Distributed Computing Systems (ICDCSO4).

"Exactly-Once Delivery in a Content-Based Publish-Subscribe System" Sumeer Bhola, Robert Strom, Saurabh Bagchi, Yuanyuan Zhao, Joshua Auerbach (2002).

"Introducing Reliability in Content-Based Publish-Subscribe Through Epidemic Algorithms" Paolo Costa, Matto Migliavacca, Gian Pietro Picco, Gianpaolo Cugola (2003) In Proceedings of the 2nd International Workshop on Distributed Event-Based Systems.

"Self-Organized Publish/Subscribe" Michael A. Jaeger (2005) In Proceedings of the 2nd International Doctoral Symposium on Middleware (DSM05).

"A Review of the Diffie-Hellman Algorithm and its Use in Secure Internet Protocols" SANS Institute InfoSec Reading Room, Nov. 5, 2001, XP002575072, Retrieved from the Internet:URL:http://www.sans.org/reading_room/whitepapers/vpns/a_review_of_the_diffiehellman_algorithm_and_its_use_in_secure_internet_protocols_751> [Retrieved on Mar. 25, 2010], the whole document is relevant.

EPO: Extended European Search Report, Application No. 09176032.2-2413, Jul. 7, 2010 (6 pages).

EPO: Extended European Search Report, Application No. 09176033.0-2413, May 10, 2010 (6 pages).

EPO: Communication pursuant to Article 94(3) EPC, Application No. 09 176 033.0-2413, Oct. 12, 2010 (4 pages).

Prati et al: "XDMS-Network Address Book enabler" IP Multimedia Subsystem Architecture and Applications, 2007 International Conference on, IEEE, Piscataway, NJ, USA, Dec. 6, 2007, pp. 1-4, XP031283339 ISBN: 978-1-4244-2671-3.

EPO: Extended European Search Report, Application No. 09176035.5-2413, Jul. 12, 1010 (6 pages).

EPO: Communication pursuant to Article 94(3) EPC, Application No. 09 176 035.5-2413, Feb. 17, 2011 (4 pages).

CIPO: PCT Written Opinion of the International Searching Authority with International Search Report, Application PCT/CA2010/000177, May 5, 2010 (8 pages).

Peterson et al.: "Enhancements for Authentication Identity Management in the Session Initiation Protocol (SIP)", IETF Network Working Group RFC 4474, Aug. 2006 (34 pages).

EPO: Communication pursuant to Article 94(3) EPC, Application No. 09 176 033.0-2413, Apr. 13, 2011 (5 pages).

* cited by examiner

SUBSCRIPTION MANAGEMENT FOR A CONTENT-BASED PRESENCE SERVICE

CROSS-REFERENCE TO RELATED APPLICATIONS

This application claims priority from U.S. Provisional Patent Application Ser. No. 61/155,017 entitled METHOD AND SYSTEM FOR COLLECTING, MANAGING AND DISSEMINATING PRESENCE INFORMATION, which was filed Feb. 24, 2009.

TECHNICAL FIELD

The present technology relates generally to telecommunications and, in particular, to the collection, management and dissemination of presence information.

BACKGROUND

In telecommunications, presence information has traditionally been used to indicate the ability, availability and willingness of a person to communicate. More generally, a person's presence information provides contextual information to let others know something about the present context of the person.

Presence is currently one of the key drivers behind instant messaging (IM) and some of the recent developments in VoIP technology, in particular Session Initiation Protocol (SIP). While these and other rudimentary presence technologies have been implemented and discussed (see, e.g., the IETF's RFC 2778 entitled "A Model for Presence and Instant Messaging" and RFC 4480 entitled "RPID: Rich Presence Extensions to the Presence Information Data Format (PIDF)"), these technologies are still generally quite embryonic. These prior-art technologies provide limited flexibility, scalability, security and privacy. Accordingly, improvements in the manner in which presence information is collected, managed and disseminated remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
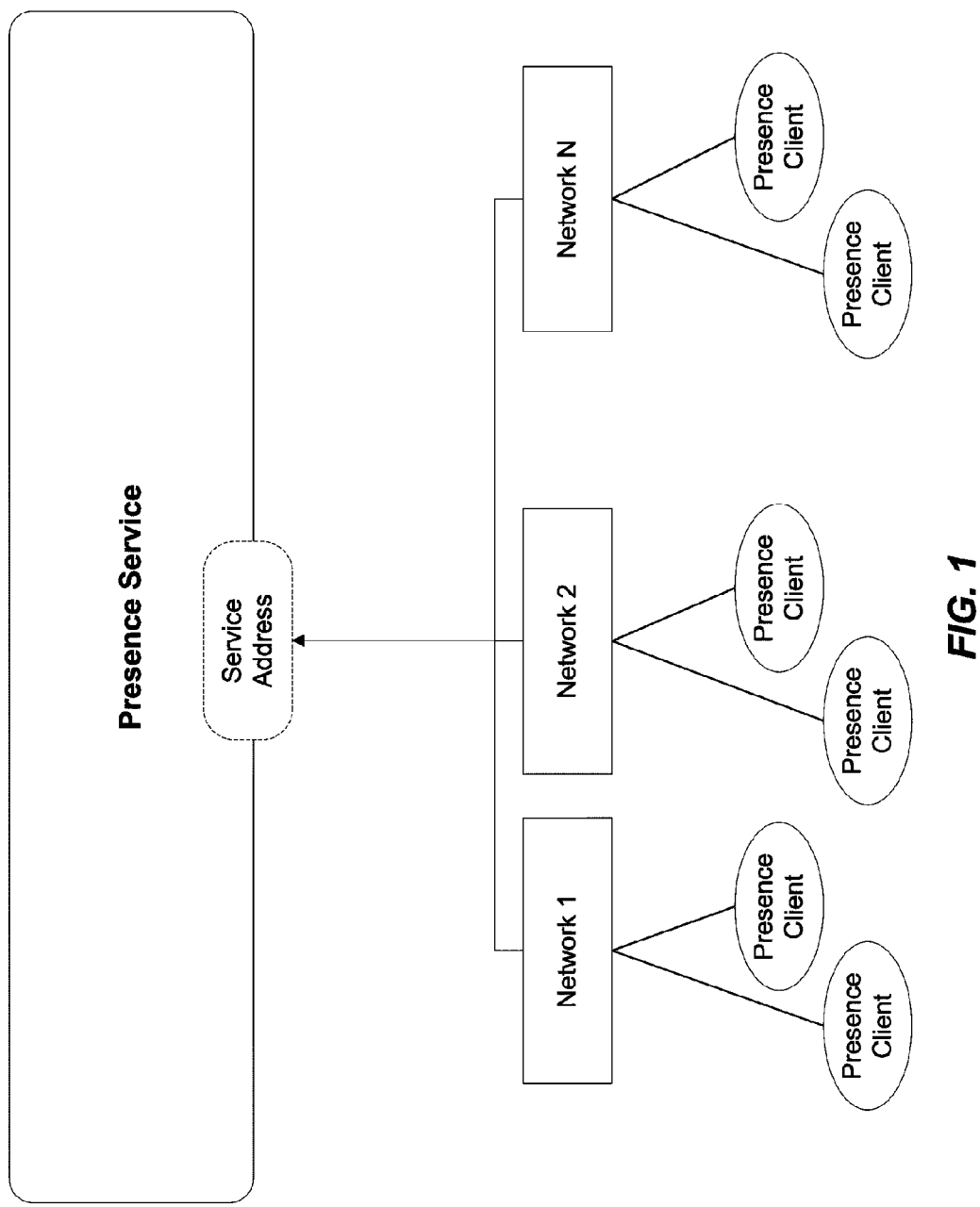
FIG. 1 schematically depicts, by way of general introduction, a presence service overlay connected to several different networks in accordance with various implementations of the present technology.

In general, the present technology disclosed herein provides an innovative presence system and related methods for collecting, managing and disseminating presence information. More specifically, novel systems, methods and devices are disclosed herein for managing subscriptions to presence information. Subscription management enables users to control the influx of presence information about presentities with whom authorized subscription relationships have been previously established.

This novel presence technology is built around a content-based presence service as opposed to one that depends on pre-arranged data formats. This novel content-based presence service enables data content representing presence information to be published and stored in any arbitrary data format. Authorized watchers can thus subscribe to the presence information, or to specific elements of the presence information ("attributes" such as location, mood, activity, availability, etc.) by simply specifying subscription expressions in terms of content. For example, a subscription expression <Contact1, location="Ottawa") would notify the user when Contact1 is located in Ottawa. This content-based approach to presence enables data content to be published in any format and enables subscriptions to be defined in terms of the content that is sought or desired. Client applications that contribute or consume presence information can be utilized and updated without having to ensure interoperability of data formats. As such, this novel presence service is highly flexible, scalable and allows highly nuanced presence information to be published or sought. Subscription management is an important aspect of a presence service. Subscription management enables subscriptions to presence information to be suspended or resumed. As will be elaborated below, suspension and resumption of subscriptions can be triggered by manual input of the user or may be based on predefined triggering conditions.

In main implementations of this technology, the presence service has, at its core, a content-based publish-subscribe subsystem for publishing data representing presence information in any arbitrary data format. An authorized contact, or watcher, can subscribe to presence information by specifying data content of interest in the form of subscription expressions that are also purely defined in terms of the content, i.e. independent of data format. When a presentity authorizes a watcher to subscribe to presence information, this establishes an authorized subscription relationship between the presentity and the watcher. The subscription may entitle the watcher to receive notifications relating to all of the presence information that the presentity publishes to the publish-subscribe subsystem or to only a specified subset of the presence information published to the publish-subscribe subsystem.

One main aspect of the present technology is a method for managing subscriptions for a content-based presence service. The method entails receiving a subscription-suspension message from a device at a presence service, identifying the subscription associated with the subscription-suspension message, and suspending the subscription. A response may then be sent from the presence service to the device to notify the device that the subscription has been suspended.

Another main aspect of the present technology is a computer-readable medium comprising code which when loaded into memory and executed on a processor of a computing device is adapted to perform the foregoing acts.

Yet another main aspect of the present technology is a method, performed on a wireless communications device, for managing a subscription to content-based presence information. The method involves sending a subscription-suspension message from the device to a presence service to suspend the subscription and then receiving a response from the presence service notifying that the subscription has been suspended.

Another main aspect of the present technology is a computer-readable medium comprising code which when loaded into memory and executed on a processor of a computing device is adapted to perform the foregoing acts.

Yet another main aspect of the present technology is a presence system for managing subscriptions to presence information. The system includes a publish-subscribe subsystem for subscribing to presence information and a proxy node for routing a subscription-suspension message from a device to a predetermined function node. The function node processes the subscription-suspension message to identify a subscription associated with the subscription-suspension message and then suspends the subscription.

Yet another main aspect of the present technology is a wireless communications device for managing a subscription to presence information. The device includes a processor operatively coupled to a memory for executing a presence client that is programmed to generate a subscription-suspension message and a radiofrequency transceiver for transmitting the subscription-suspension message to a presence service to suspend the subscription.

The details and particulars of these aspects of the technology will now be described below, by way of example, with reference to the attached drawings.

FIG. 1 schematically depicts, by way of general introduction, a presence service overlay in accordance with various implementations of the present technology.

This novel presence system can be understood as a service overlay superimposed on a mobile network infrastructure and the Internet. In other words, the general architecture depicted in FIG. 1 supports access to the presence service through a mobile network infrastructure or through IP networks. The presence server is thus seen as a singular service entity by the presence clients. The system architecture is also readily scalable, and can support very large numbers of users.

The presence system is defined using a client-server style architecture in which presence clients produce and consume presence information. In general, and as will be elaborated below, presence information that is generated (collected and published) by one or more presentities may be consumed by one or more watchers. A user may be both a presentity and a watcher, or only one or the other. Mediating between presence clients is a presence server. This presence server receives, manages and disseminates the presence information.

The presence server uses a single global service identifier to simplify routing of data. For example, for certain types of wireless clients communicating through a mobile network infrastructure, the presence service has a single global service identifier (or service address). This approach simplifies routing of data and avoids coupling of the presence server with the mobile network infrastructure topology.

Still by way of introduction and overview, the presence server may be implemented as a tiered system made up of a proxy tier, a function tier and a persistence tier. This tiered structure of the presence server is transparent to presence clients. Presence clients may communicate with the presence server using a presence protocol.

For the purposes of this specification, the expression "presence information" refers to a set of information that conveys ability, availability, willingness for various modes of communication, e.g. e-mail, voice, short message service (SMS), multimedia message service (MMS), instant messaging (IM), for various services and various devices. Presence information usually contains specific, unambiguous states such as available/unavailable, current location, activity, holiday/working, sleeping/awake; however, it may also contain ambiguous, nuanced, subtle or qualitative information such as mood, interests, intentions, wishes, etc.

For the purposes of this specification, a "presentity" combines devices, services and personal information for a complete picture of a user's presence status.

Figure 2:
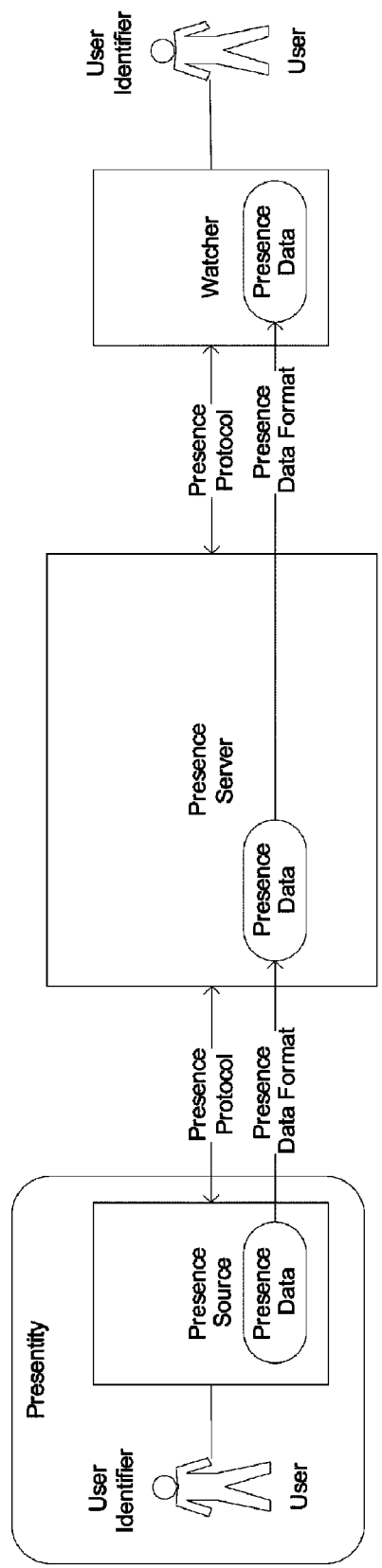
FIG. 2 schematically depicts the relationships among the basic elements of a presence system, namely the presentity (that is associated with a user), a watcher and a presence server that mediates between the presentity and the watcher.

FIG. 2 schematically depicts the relationship among the basic elements of the system, namely the user, presence server and presentity. As depicted schematically in this figure, the presentity includes a first user characterized by a first user identifier and a presence source (i.e. a first presence client) for generating presence data about the user. This presence data is communicated using a presence protocol to a presence server which, in turn, shares this presence data with a watcher (i.e. a second presence client associated with a second user). In this simple unilateral scenario, the first user is thus a supplier or provider of presence data while the second user (watcher) is a consumer (i.e. recipient, viewer) of the presence data. In a bilateral scenario, the first user would also receive presence data about the second user. The sharing of presence data may be symmetrical where both exchange the same types of presence data or asymmetrical where one user consumes more presence data than the other, or one user supplies more presence data than the other.

System Architecture and Presence Protocol

As noted above, the presence system is a service overlay superimposed on a mobile network infrastructure and/or the Internet. From the perspective of presence clients, the presence service appears as a singular server instance. The service can be identified by a single global service identifier on all instances of the mobile network infrastructure.

The presence protocol is an application protocol that can be transported over the existing network using a suitable transport protocol or wireless transport protocol. The presence protocol depends upon underlying transport layers such as TCP/IP only for basic message delivery services. It is not dependent upon the specifics of transport layer addressing, routing or network topologies.

As a consequence of the design of the system architecture and of the presence protocol, the presence system is decoupled from the network topology (e.g., the presence system is not coupled to any particular instance of a mobile network infrastructure). Furthermore, not only are system functions separate and independent from the applications, but also the applications themselves operate independently of one another. The architecture and protocol moreover enable the following: (i) flexible message routing as defined by the applications, (ii) enhancements and extensions without requiring upgrade or restart of the entire system, and (iii) the addition of individual components to implement new versions of the protocol independently.

A multitude of considerations have influenced and guided the design of the architecture and of the presence protocol such as, for example, having a well-defined protocol layering, and using version management (e.g. ensuring that each message identifies the version of the protocol with which it complies). Transport mapping was also another key consideration in the design the architecture and protocol. For example, the system is designed to map the presence protocol onto underlying network transports to provide basic message delivery services. The system is also designed to work with symmetric, Internet-style transports such as SCTP or SIP for server-server communication. Transaction support is another important consideration. For instance, messaging order can be achieved by implementing a sequence number (which enables local message order correction). The system may also use a transaction identifier to associate related requests and responses.

A further design consideration was to implement a message-based structure (e.g. datagrams for message-oriented communication, application multiplexing, user session multiplexing, application-specific protocol fields and data elements).

Yet a further consideration was network decoupling (i.e. applications and users named independently of underlying network addresses). For example, the transport protocol identifies devices and service whereas the presence protocol identifies users and sessions.

Still a further consideration was to make the system asynchronous and non-blocking. Accordingly, applications are independent of each other, users are independent of each other, and clients are independent of each other.

Security was also a key requirement for this novel system. The system does not reveal any information, such as authorization or filters, through response codes or other normal operations. A key management protocol may be used to ensure communication security between presence clients and the presence service so that presence data is shared in total privacy with only the intended recipient(s). User authentication ensures that only authorized clients are able to receive presence information. System security and user authentication will be described in greater detail below.

Figure 3:
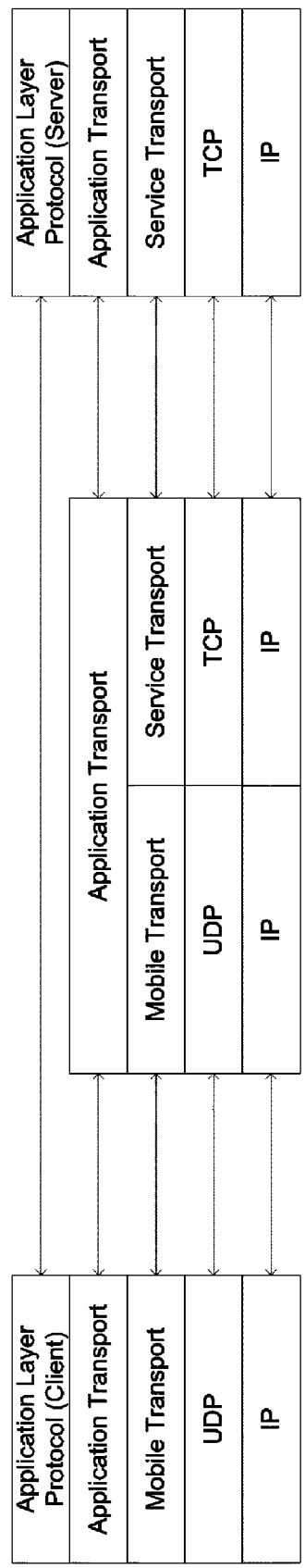
FIG. 3 is a generalized protocol stack diagram for a wireless client that can be used to implement the novel presence service disclosed herein.

Referring now to FIG. 3, the presence protocol is an application layer protocol transported by the transport layer. FIG. 3 shows an example of a protocol stack for a wireless client that can be used to implement the novel presence service disclosed herein. In this example, service transport is performed using TCP/IP whereas mobile transport uses UDP/IP. These protocols are disclosed solely by way of example to illustrate one main wireless implementation of this technology. Other protocols may be used or substituted, as would be understood by those of ordinary skill in the art.

Figure 4:
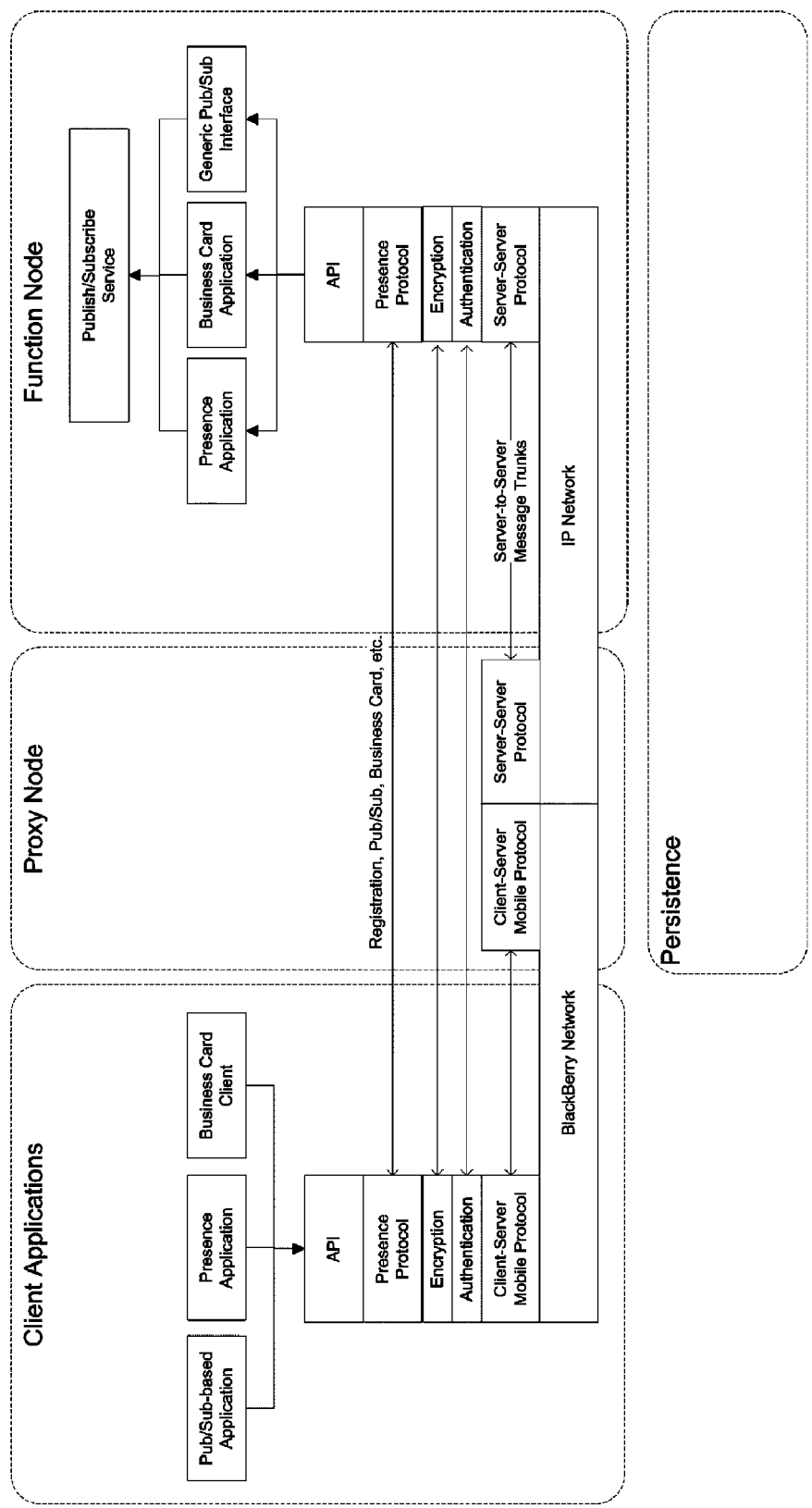
FIG. 4 presents a stack view showing how client applications may interact with a function node via a proxy node.

FIG. 4 provides a stack view of the protocols and applications that can be used to implement this novel presence system. This figure shows how the client applications (e.g. pub/sub-based application, presence application, business card application) interact with the function node via the proxy node. These three client applications are presented merely by way of example to illustrate how such applications interface via the presence protocol with respective applications at the function node.

Figure 5:
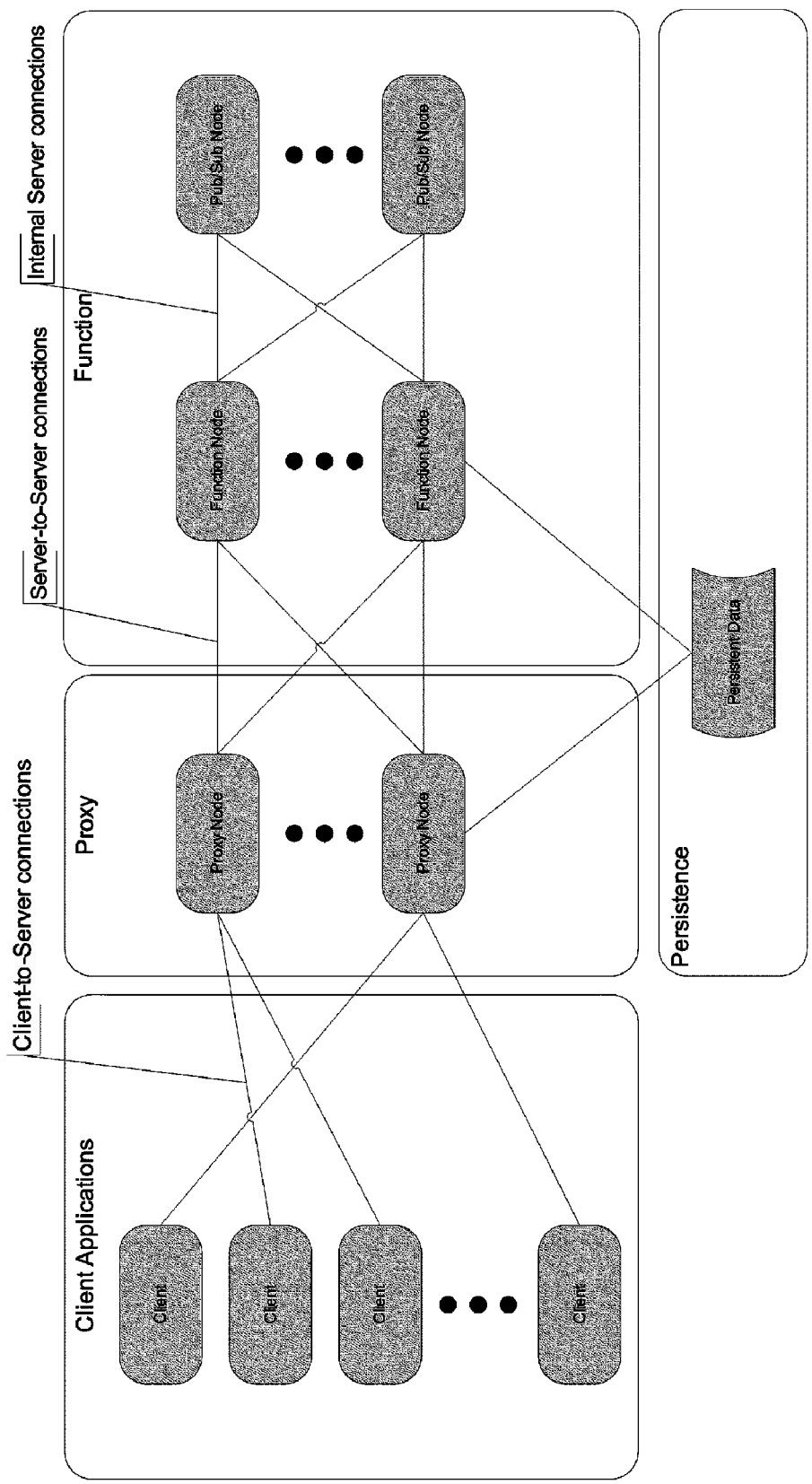
FIG. 5 is one example of a network topology that can be used to implement a presence system in accordance with the present technology.

FIG. 5 illustrates an example of a network topology that can be used to implement the novel presence system. In this example topology, each client connects to only one particular proxy node. Each proxy node is, in turn, connected to all of the function nodes, as depicted in this figure. The function nodes are also connected to every pub/sub node. The proxy nodes and function nodes may also be in communication with the persistent data store (persistence tier).

Figure 6:
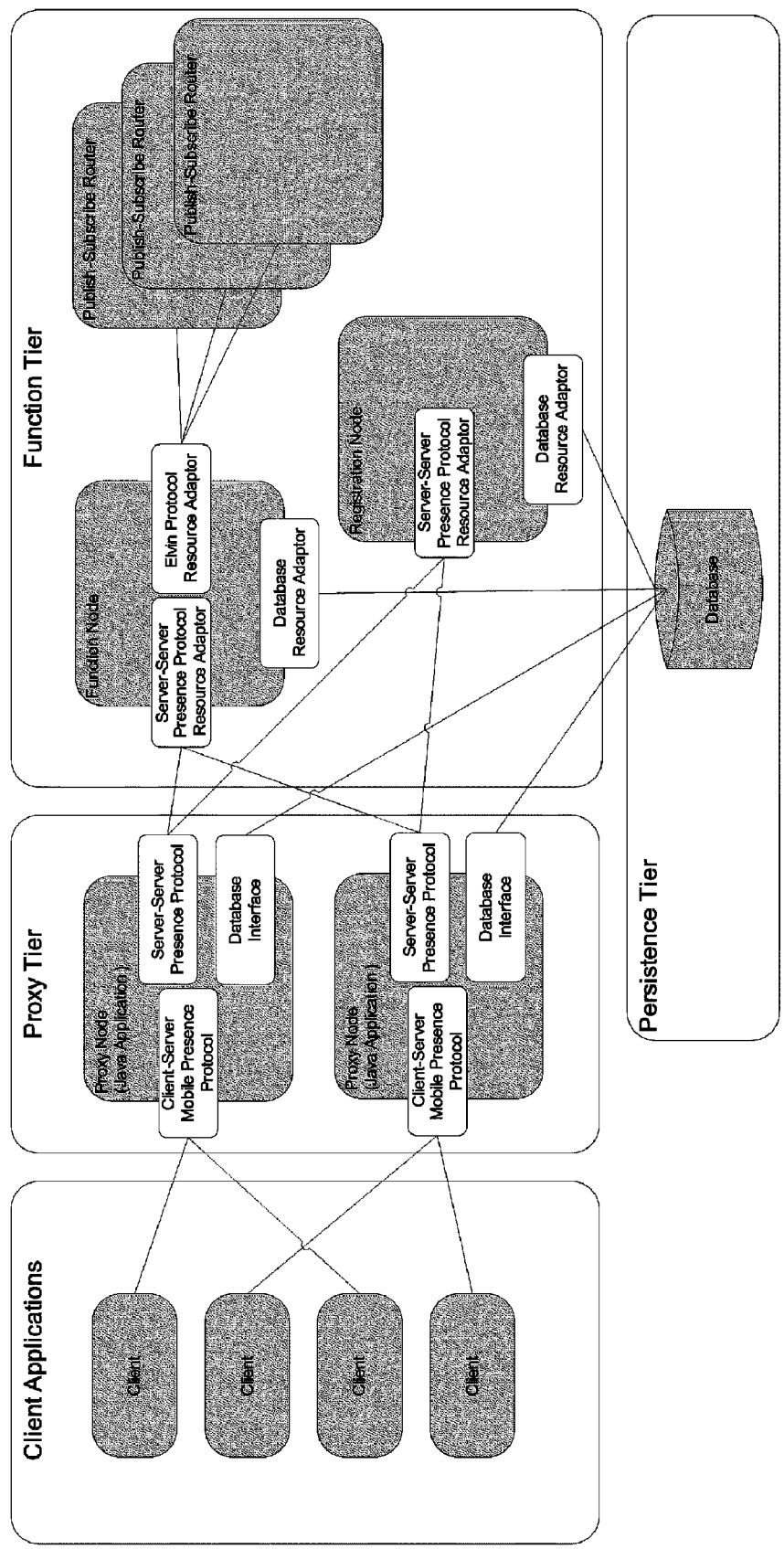
FIG. 6 presents a schematic view of one implementation of the presence system, depicting various interactions amongst the client applications, proxy tier, function tier and persistence tier.

FIG. 6 illustrates an example implementation of the architecture of the presence system. As depicted, each proxy node includes a database interface for communicating with the database in the persistence tier. Each proxy node comprises distinct interfaces (resource adaptors) for the client-server mobile presence protocol and the server-server presence protocol. As further depicted in FIG. 6, each function node includes a server-server presence protocol resource adaptor (for communicating with a counterpart server-server presence protocol resource adaptor at the proxy node), a database resource adaptor and a pub/sub protocol resource adaptor. As further illustrated in this figure, the registration node includes a server-server presence protocol resource adaptor (for communicating with a counterpart server-server presence protocol resource adaptor at the proxy node) as well as a database resource adaptor.

In the novel presence system, the client applications may be realized as Java applications running on a mobile device, although any other suitable programming language may be used. In addition to a presence client application, the client applications may include, for example, a distinct presence registration client application and a business card client application.

The proxy tier may also be realized as a Java application that executes on a set of servers known as proxy nodes which are connected to the infrastructure via a suitable transport protocol. These proxy nodes act as gateways which terminate the transport protocols and route presence protocol messages to their correct destinations.

Messages sent from a client to the presence service are routed by a proxy node to the appropriate node in the function tier based upon the identity of the client and the specific application identified in the message.

Messages sent from the presence service to a client are routed by a proxy node based upon the Universally Unique Identifier (UUID) contained in the message.

By way of example to illustrate one possible implementation of this technology, the function tier may be composed of a set of specialized application nodes:
  Registration Nodes
  Subscription/Notification Nodes
  Publication Nodes
  Peer-to-Peer Nodes
  Publication/Subscription ("Pub/Sub") Router Nodes The application nodes of the functional tier may be deployed on separate servers or together in various combinations or clusters depending upon any deployment requirements.

The persistence tier can be implemented, for example, as a database running on a server, a cluster of servers or a network of servers.

Figure 7:
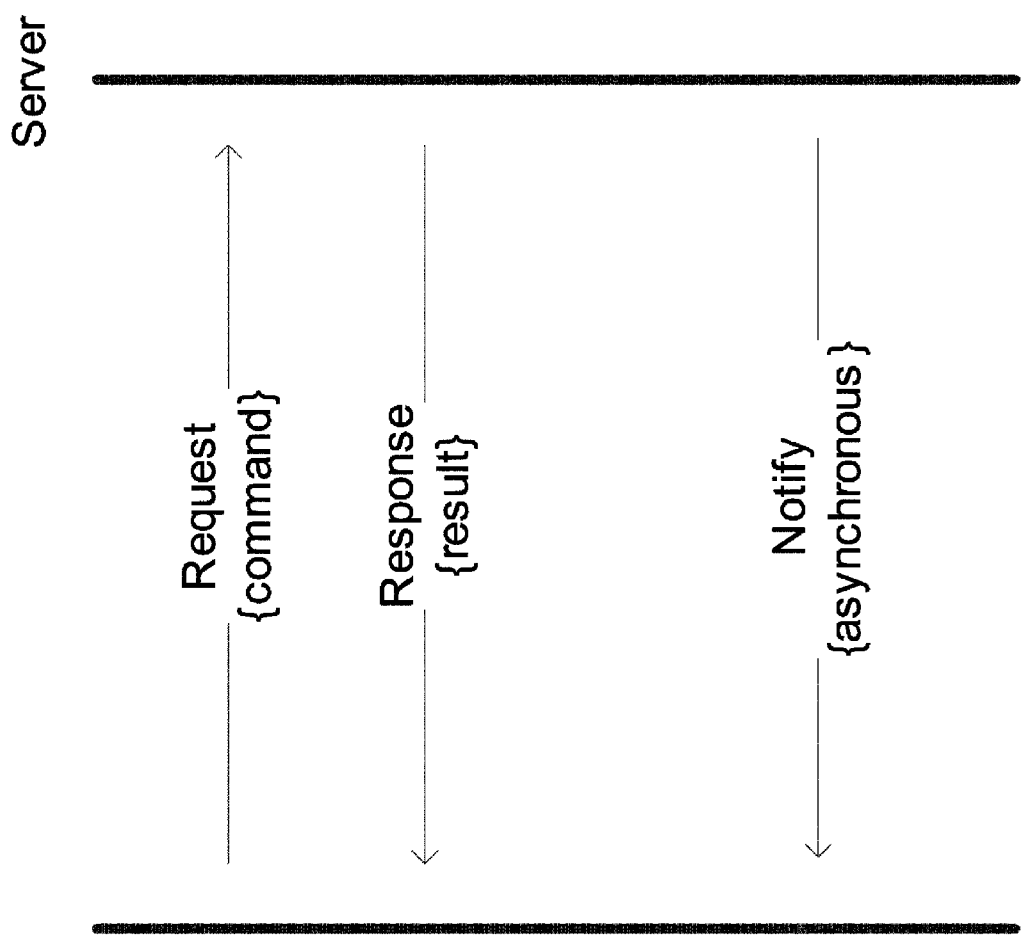
FIG. 7 is a high-level depiction of synchronous (request-response) and asynchronous message delivery paradigms which are both supported by the presence protocol.

The presence protocol supports request-response style (i.e. synchronous) message exchanges as well as asynchronous message delivery, which are depicted schematically in FIG. 7.

Applications such as registration, publication, subscription/notification and peer-to-peer communication are independent of each other within the presence protocol layer. In particular, routing of messages is independent and distinct for each application.

Figure 8:
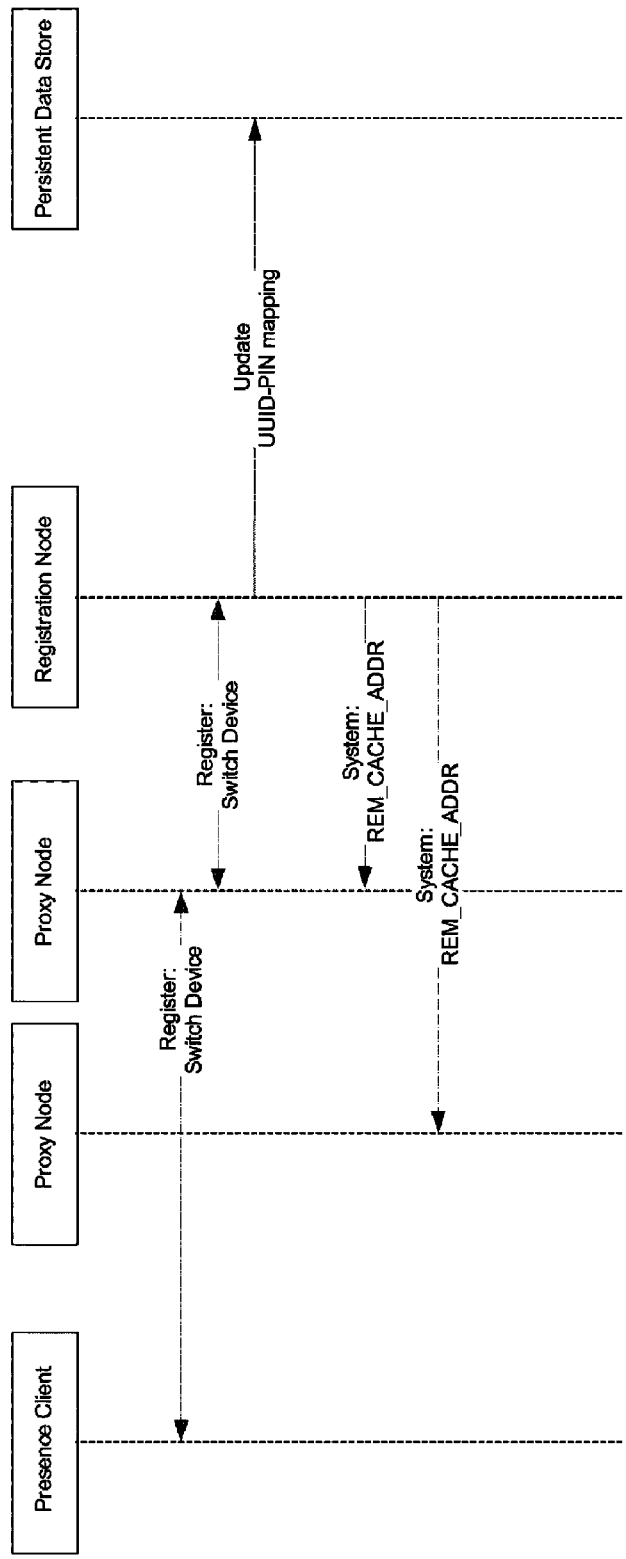
FIG. 8 schematically depicts an example of a system message sequence for registration of a new device whereby a mapping that links the user to his device is stored in the persistent data store.

In main implementations of this technology, different message categories are employed to identify messages related to different aspects of the presence service. FIG. 8 schematically depicts an example of a system message sequence. This figure illustrates the use of the system message category to manage cached UUID-mobile device identifier mappings. In this example, the user has switched mobile devices (presence client) causing the UUID-mobile device identifier mapping table maintained in the proxy node caches to become invalid. Upon completion of the switch device re-registration procedure, the registration node sends a system message to all proxy nodes instructing them to remove their cached entries for the UUID-mobile device identifier mapping if one exists.

The next time the presence service sends a message to the presence client the proxy node responsible for routing the message will retrieve the new UUID-mobile device identifier mapping from the persistent data store.

Figure 9:
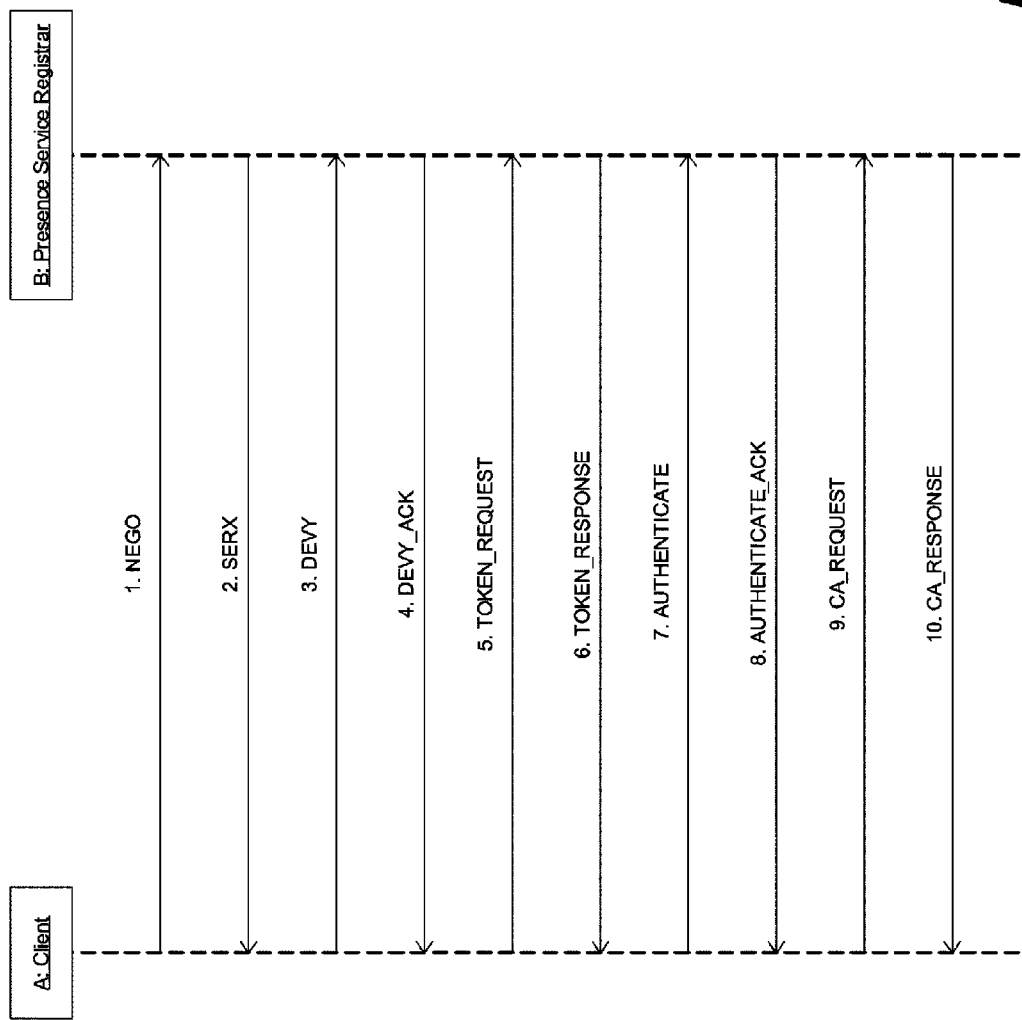
FIG. 9 schematically depicts an example of a registration message sequence between a presence client and a presence service registrar (registration node)

FIG. 9 schematically depicts an example of a registration message sequence. The registration message category may be used to identify messages related to user registration with the presence service. The sequence of messages exchanged between the client and the presence service registrar is illustrated in the sequence diagram shown in FIG. 9. Each message is identified through its abbreviated name. Registration is thus a synchronous process that involves the exchange of messages between a presence client and the presence service registrar or registration node. In most implementations, the messages are exchanged through a relay, to be described in greater detail below with regard to FIG. 15.

During registration, one message is sent via e-mail to the presence client to verify ownership of the selected user identifier e-mail address. In a specific implementation, this special e-mail message contains only an attachment with content type "application/x-rimdevice-MailAuthToken-authToken-.ext", for example. The attachment contains, in most implementations of this technology, an authentication token.

In one specific implementation, each registration message comprises an eight-byte fixed-length registration session identifier field followed by a single TLV command field where TLV refers to a command encoded using a Type-Length-Value format.

Peer-to-peer messages enable a presence client to communicate with another presence client via the presence system. The presence service mediates the communication, authenticates clients and routes messages between clients.

There are two basic scenarios for peer-to-peer communications. The first scenario is the most common in which the sending party knows the UUID (universally unique identifier) of the destination. In the second scenario the sending party does not yet know the UUID of the destination—only the email address of the destination is known.

Figure 10:
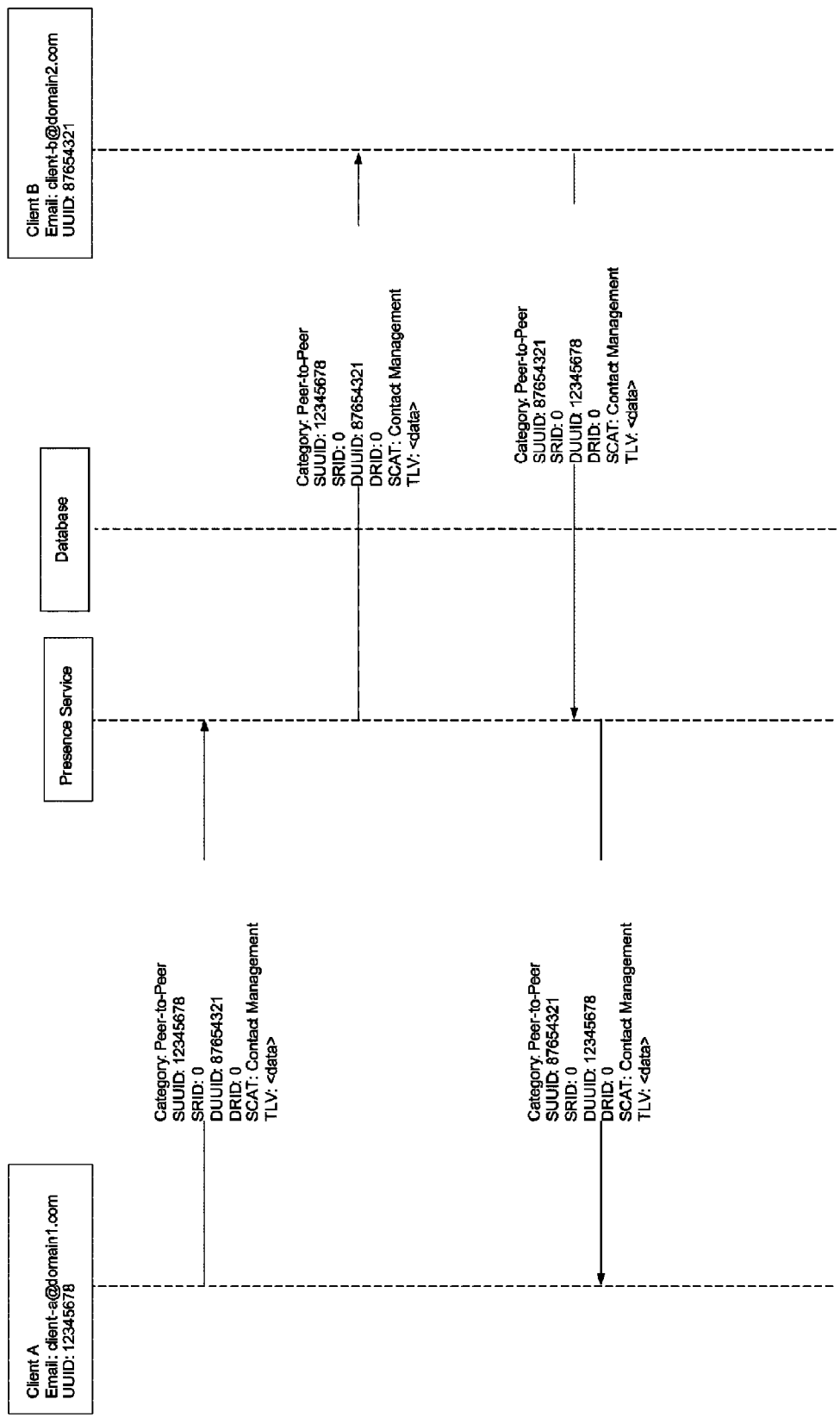
FIG. 10 schematically depicts a peer-to-peer message sequence for a known DUUID (i.e. the destination's universally unique ID)

In FIG. 10, Client A sends a peer-to-peer message with the DUUID field populated with UUID of Client B. The presence system inspects the DUUID and forwards the message to Client B.

Figure 11:
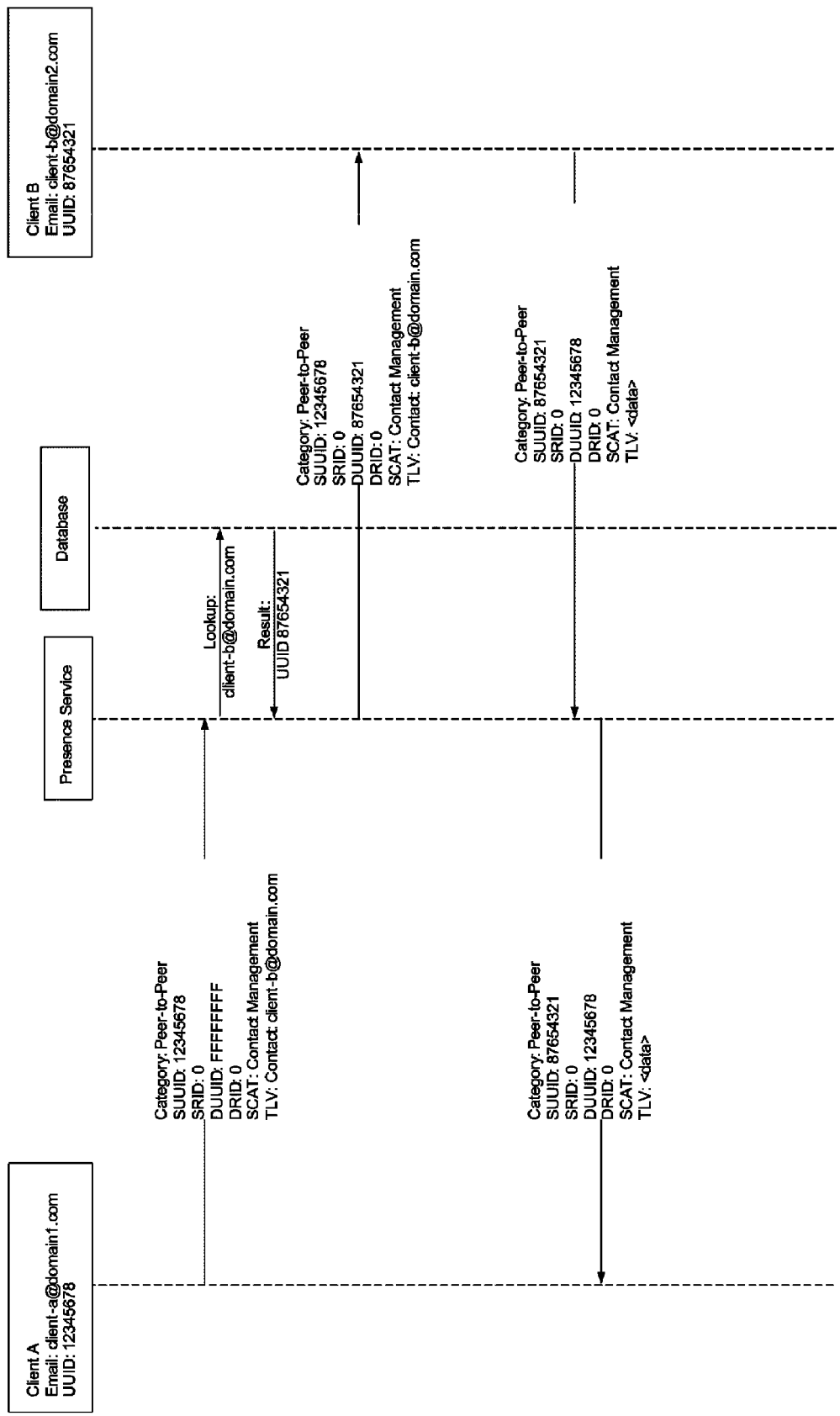
FIG. 11 schematically depicts a peer-to-peer message sequence for an unknown DUUID.

In FIG. 11, Client A sends a message to Client B. Client A knows only the email address identifier of Client B—Client A does not yet know the UUID of Client B. This would be the case if, for example, Client A and Client B have had no prior communication or exchange of UUIDs.

Client A populates the DUUID field with "all Fs" (or any other predetermined sequence of letters, numbers or symbols) to indicate to the Presence System that the UUID of the destination is unknown and that there is a TLV-encoded email address included for Client B.

The presence system performs a database lookup on the e-mail address to obtain the corresponding UUID for Client B. The DUUID field is then populated with the UUID of the destination (in this case Client B) and the message is forwarded to Client B.

Subscribing to Presence Information

The present technology enables a user ("watcher") to subscribe to presence information generated and published to the presence service by a presentity and to manage these subscriptions to control the receipt of presence information for which authorized subscription relationships have been previously established. With the presentity's authorization, the watcher thus establishes a subscription relationship with a presentity. This subscription relationship is consensual in the sense that the watcher may only receive presence information when allowed by the presentity that publishes the presence information. As will be elaborated below, the presentity may impose content-based conditions, time-based conditions, location-based conditions, or any other such conditions on the subscription so as to limit and control what information may be communicated and under what circumstances the information may be communicated. To establish an authorized subscription relationship between a presentity and a watcher, a subscription request is communicated by the would-be watcher to a content-based presence service. The subscription request is then validated by the presence service by determining if information contained in the subscription request represents an authorized subscription relationship, e.g. if the identity of the would-be watcher making the request and the type of information sought by the would-be watcher are accepted by, or acceptable to, the presentity that is of interest to the would-be watcher. In other words, an authorized subscription relationship is created when a presentity grants permission, however limited or contingent, to a watcher to access published data content representing the presence information. The method also involves specifying a subscription expression defining data content that is of interest to the second user (i.e. the watcher) and then receiving presence information about the first user (i.e. the presentity) when the subscription expression matches the data content published by the first user (the presentity) to the presence service. Publishing and/or watching may be accomplished using a wireless communications device. In that case, assuming the wireless communications device has a positioning-determining subsystem, e.g. a GPS chipset, the current time and/or current location of the wireless communications device may be used to determine or filter when a subscription request is sent or how the subscription is expressed. In other words, presence information may be collected based on a time condition and/or a location condition (e.g. only between 9 a.m. and 5 p.m. and provided that the location corresponds to London, England). Similarly, publication of any collected presence information may be controlled by time- and/or location-based criteria. Moreover, as mentioned above, the subscription may stipulate time- and/or location-based conditions that must be met before any presence information is disseminated to a watcher.

Figure 12:
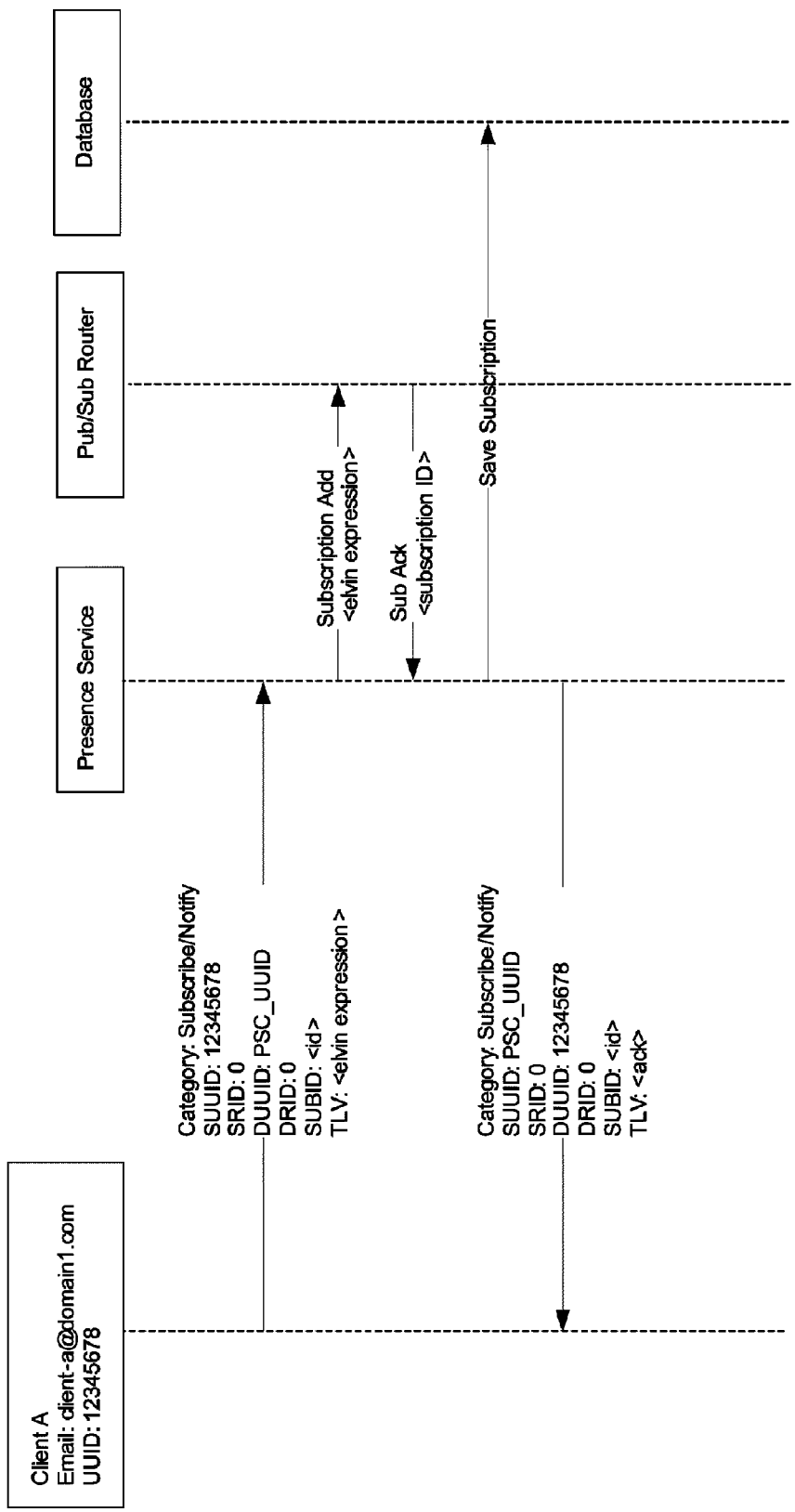
FIG. 12 schematically depicts a message sequence for subscribing to a presence service.

FIG. 12 schematically depicts a message sequence for subscribing. This figure illustrates the messages exchanged between a presence client and the presence server to add a subscription (i.e. create an authorized subscription relationship) so that the presence client will be notified of published data or events that are of interest to the presence client and for which the authorized subscription relationship permits access. The presence client expresses its interest using, for example, a subscription expression language. In general, clients register subscriptions with, or send notifications to, the server (i.e. to the publish-subscribe subsystem or "pub-sub core"). When the pub-sub core receives a notification, it forwards it to all clients whose subscriptions match that notification, i.e. to all clients who have expressed an interest (as defined by their respective subscription expressions) in the content of that notification. The subscription expressions can be cast in terms of names (i.e. data labels or data wrappers), operators (i.e. logical or Boolean operators), and literals (e.g. strings).

Figure 13:
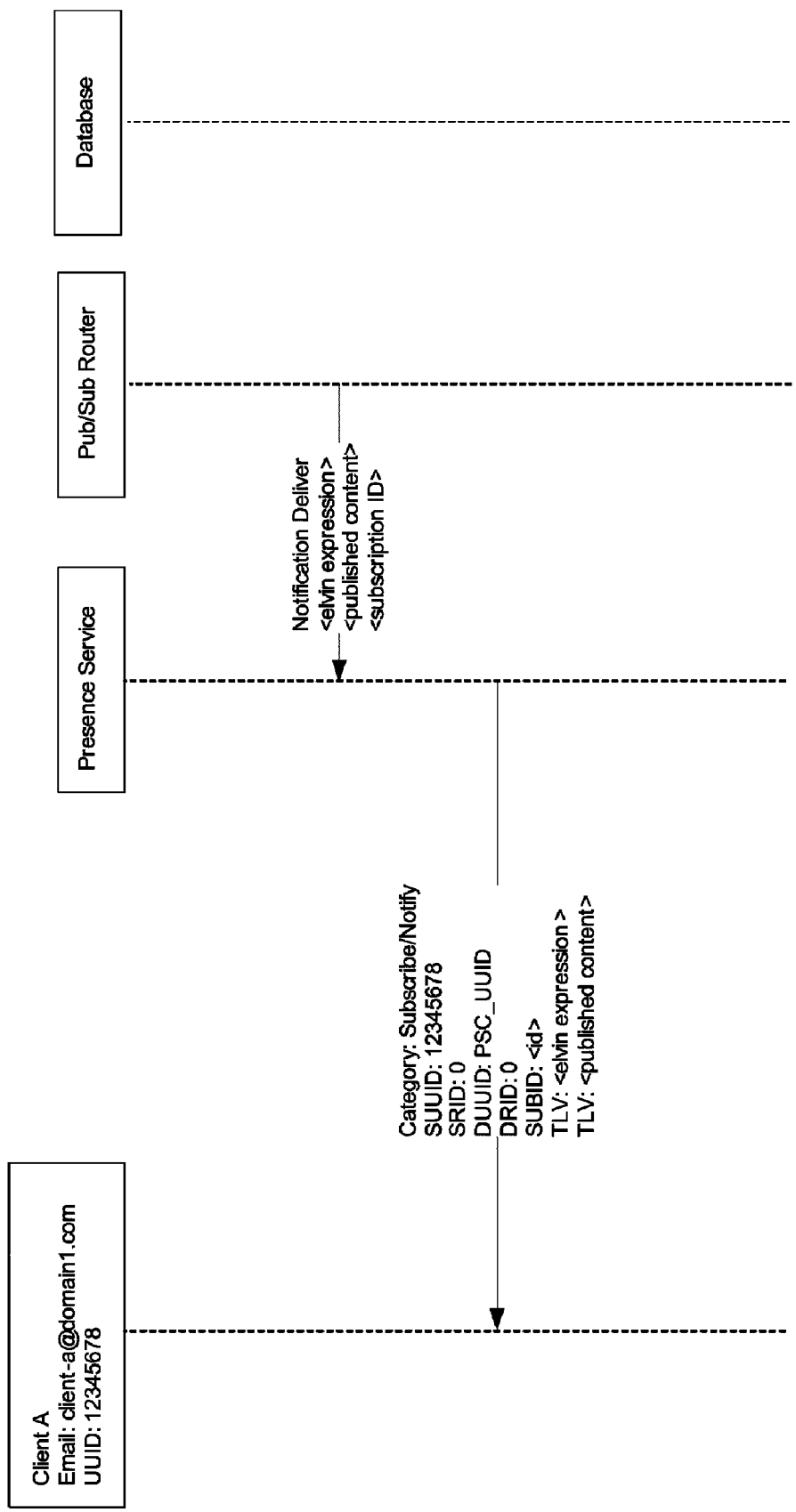
FIG. 13 schematically depicts a message sequence for notifying a watcher of presence information.

The presence server compares the subscription expression with data published by other sources in the future to determine whether there is a match. Whenever there is match with the subscription expression, the presence server sends a notification containing the matching data to the presence client as shown in FIG. 13.

Publishing Presence Information

The present technology enables presence information to be published using a computing device such as, for example, a wireless communications device. This involves collecting presence information, publishing data content representing presence information to a content-based presence service, the presence service storing the data content in any arbitrary data format, and authorizing an interested contact to subscribe to the presence information. The interested contact thereby becomes a watcher when the subscription is authorized. This watcher thus receives the published data content representing the presence information of the presentity of interest when a subscription expression specified by the watcher matches the data content published to the presence service by that presentity. Publication may be accomplished using a wireless communications device, which may include a position-determining subsystem such as, for example, a GPS chipset. In that case, the current time and/or current location of the wireless device may be used to determine or filter what presence information is collected and/or published.

Figure 14:
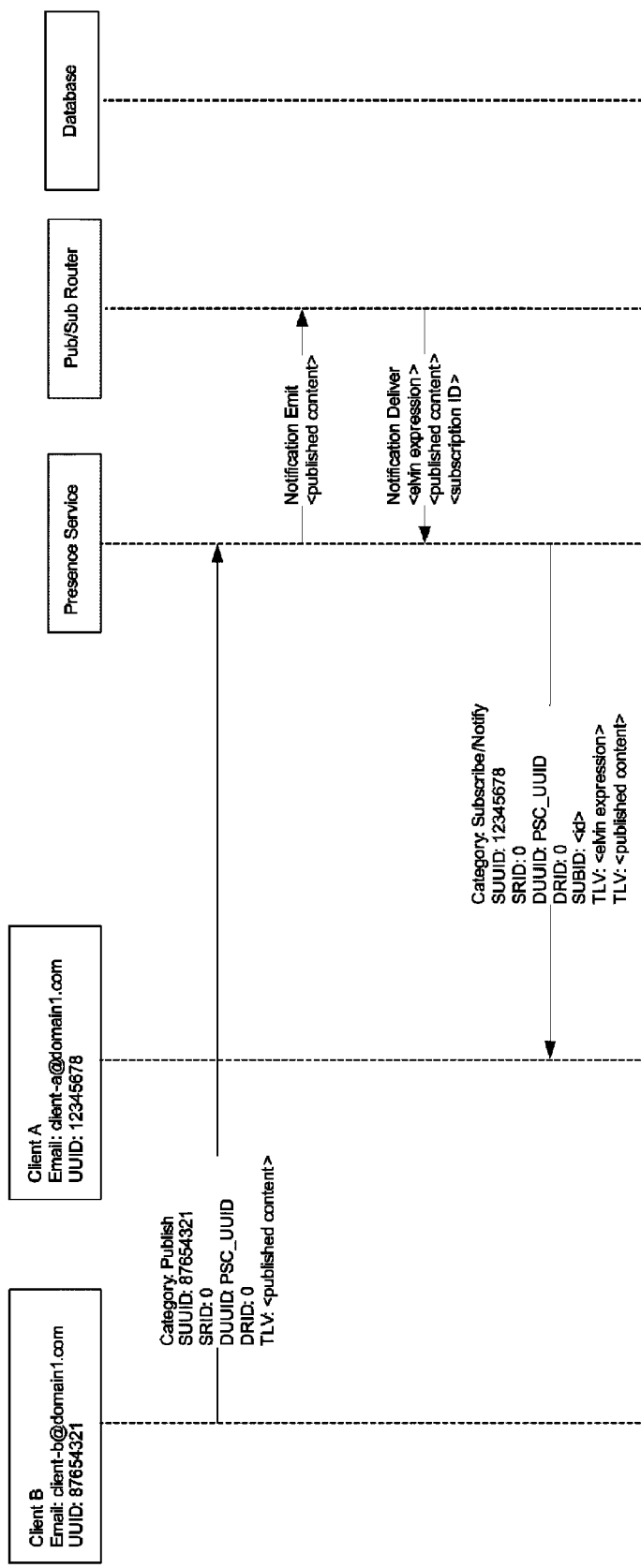
FIG. 14 schematically depicts a message sequence for publishing presence information.

FIG. 14 schematically depicts a message sequence for publishing. This figure illustrates the messages exchanged between a presence client and the presence server when publishing presence data. For completeness of the example, it is assumed that Client A has previously added a subscription as illustrated in FIG. 12.

The publish message sent to the presence server by Client B contains the data that is intended to be published. The presence service compares the published data with subscription expressions previously received from other clients with whom Client B has authorized subscription relationships. In this example, the published data matches a subscription expression and the presence server sends a notification containing the published data to Client A which created the matching subscription expression.

Registration

Figure 15:
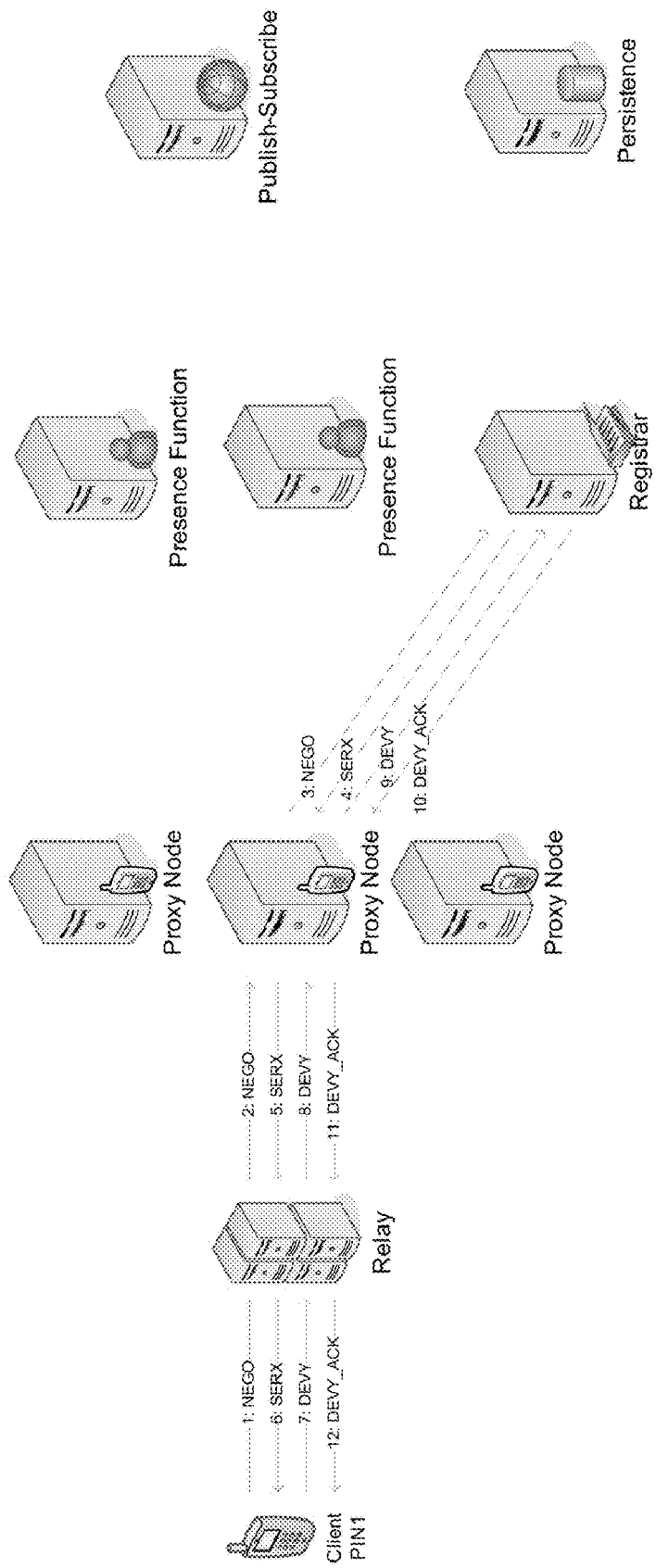
FIG. 15 schematically depicts a client-server key negotiation process as a first phase of the presence registration procedure.

FIG. 15 schematically depicts a client-server key negotiation as part of the presence registration procedure. This figure illustrates, by way of example, an initial key negotiation phase of the presence registration procedure. The presence client sends the first NEGO message inside a transport layer message addressed to the service identifier of the presence service. The mobile network infrastructure forwards this message to the service identifier of one of the proxy nodes. The selected proxy node removes the transport protocol headers, inspects the message category and forwards the message to a presence registrar (registration node). All subsequent messages related to the client registration session follow the same path between the presence client and the presence registrar.

Upon completion of the key negotiation phase, the presence client and the presence registrar will have established a trusted, encrypted communications channel. This can be accomplished using, for example, the Diffie-Hellman key exchange technique.

Figure 16:
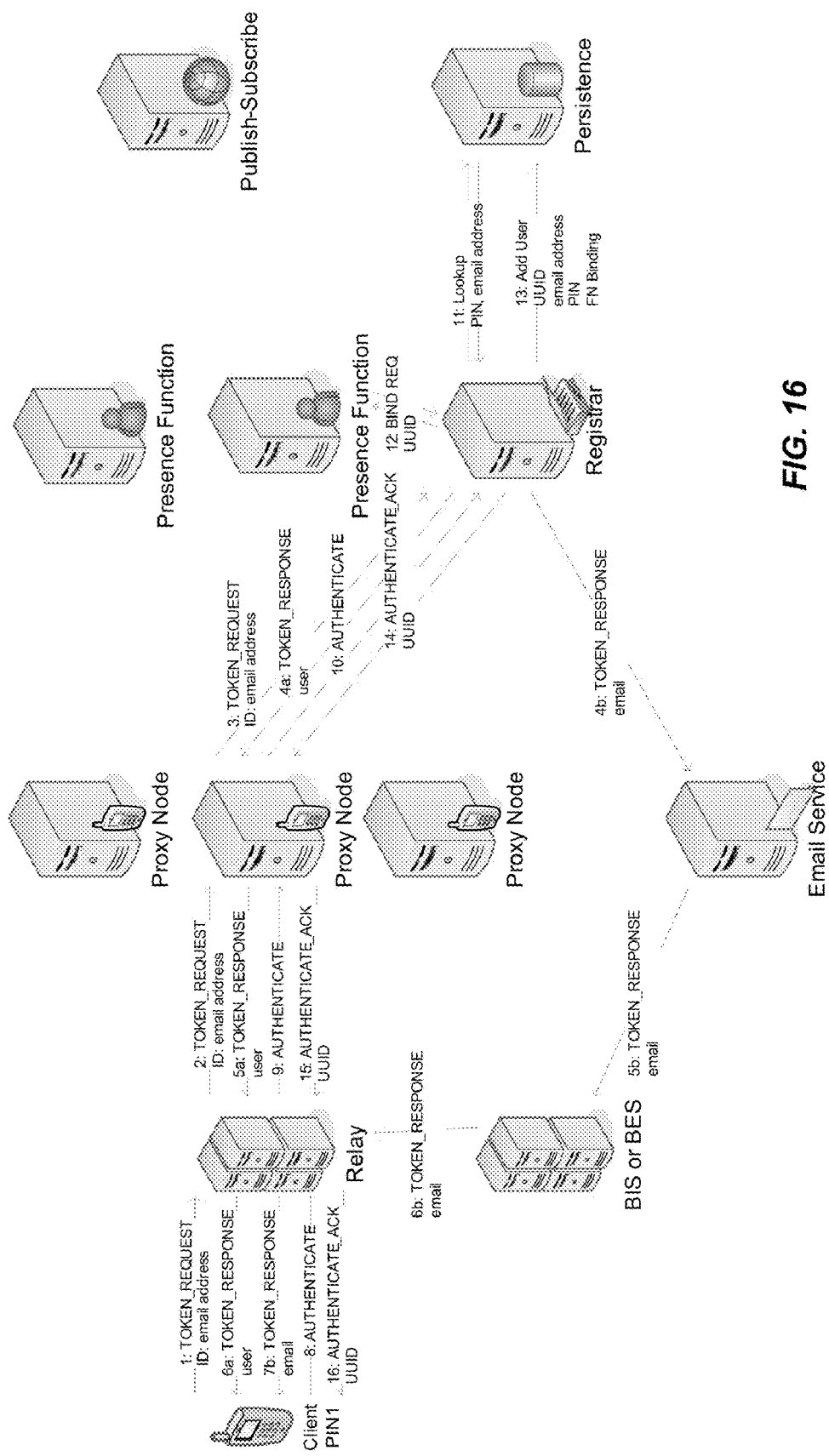
FIG. 16 schematically depicts how a user identifier is selected and authenticated as a second phase of the presence registration procedure.

FIG. 16 schematically depicts how a user identifier is selected and authenticated as a second phase of the presence registration procedure. This figure illustrates, by way of example, the selection and authentication of the user identifier as the second phase of the presence registration procedure.

The procedure is initiated when the user's device sends, e.g., the [1:TOKEN_REQUEST]) message to the Presence Registrar. This message contains an identifier, typically an e-mail address, selected by the user. To verify that the user actually owns the identifier, the presence registrar sends, e.g., [4a:TOKEN_RESPONSE] to the presence client using the presence protocol and also sends, e.g., [4b:TOKEN_RESPONSE] to the presence client via e-mail. These TOKEN_RESPONSE messages each contain unique security material which the presence client combines and sends back to the presence registrar in, e.g., the [8:AUTHENTICATE] message to prove ownership of the e-mail identifier. Other authentication techniques may be used in lieu of, or in addition to, the procedure described above.

Upon successful authentication of the user's identifier the presence registrar performs a lookup, e.g., [11:Lookup] to determine if the user is a new registrant or if they have previously registered with the presence service. In this scenario the user is a new registrant so the presence registrar generates a new Universally Unique Identifier (UUID) for the user, establishes a binding for the user with a function node using a binding request message, e.g., [12:BIND_REQ] and adds the user's profile in the persistent data store using an add message, e.g., [13:Add User].

The final step of the presence registration procedure is to send an authentication acknowledgement, e.g., [14:AUTHENTICATE ACK] back to the presence client to acknowledge successful registration. The acknowledgement message contains the user's newly generated UUID.

Upon completion of this phase the user is registered with the presence service. The following has thus been accomplished:

UUID generated/assigned to the user

Association of e-mail address and mobile device identifier with UUID

Binding with function node established

User profile created in persistent data store

Figure 17:
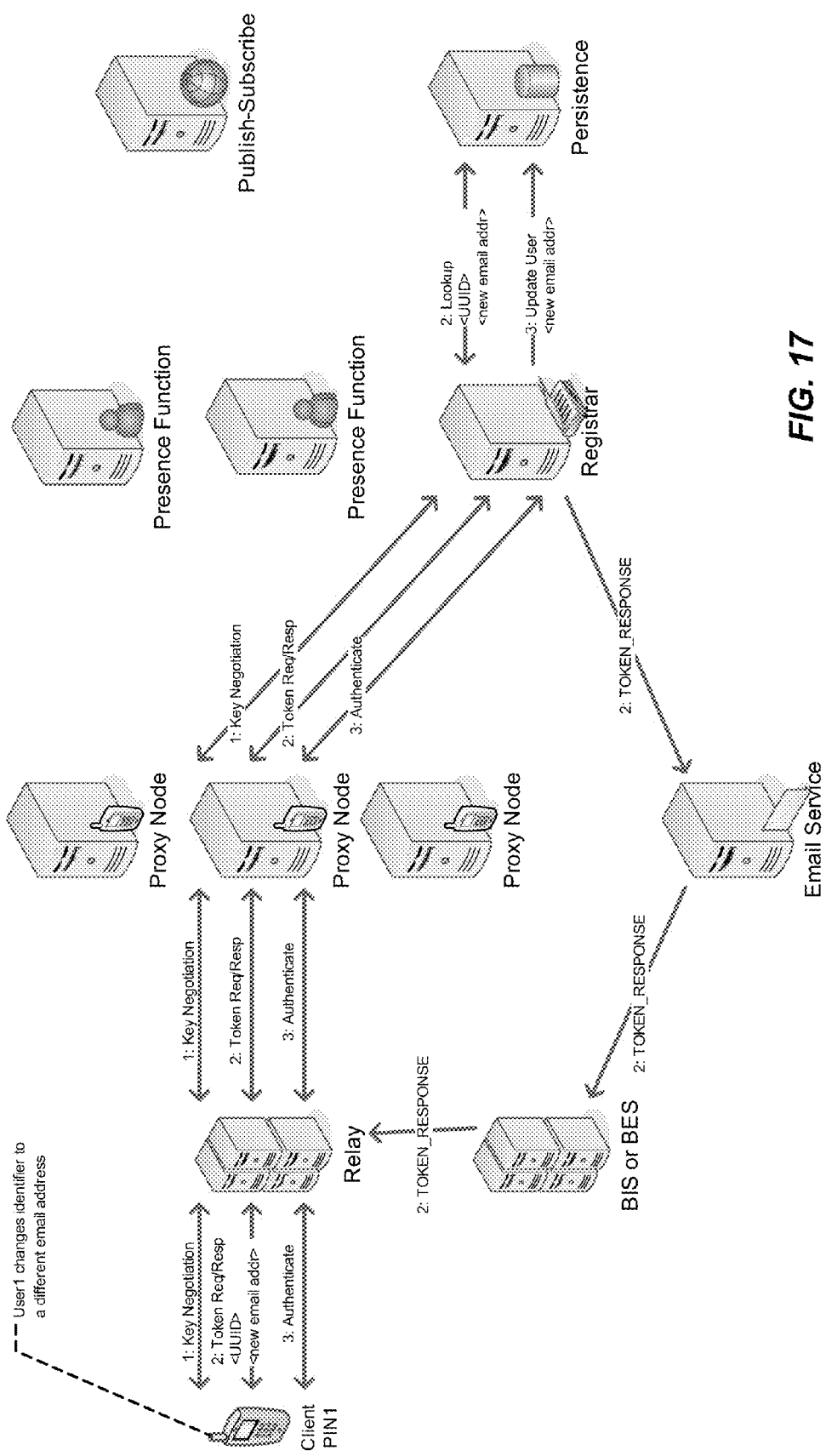
FIG. 17 schematically depicts how a user identifier can be changed.

FIG. 17 schematically depicts how a user identifier can be changed. This scenario illustrates the procedure that is run when a user decides to change their user identifier to a different e-mail address. The procedure is similar to the presence registration procedure described above but differs slightly in that the presence client is already known to the presence service. Accordingly, the user's UUID is included in the token request message, e.g. [TOKEN_REQUEST]. The user profile is then updated in the persistent data store. It is to be noted that the binding with the function node is already in place from the initial registration.

Sharing and Updating a Virtual Business Card

In addition to collecting, managing and disseminating presence information, the presence system disclosed herein may also be used to share and update virtual business cards. A virtual business card, such as, for example a vCard, is a data file that stores a contact's name, company name, work address, telephone and fax numbers, e-mail address, etc.

Figure 18:
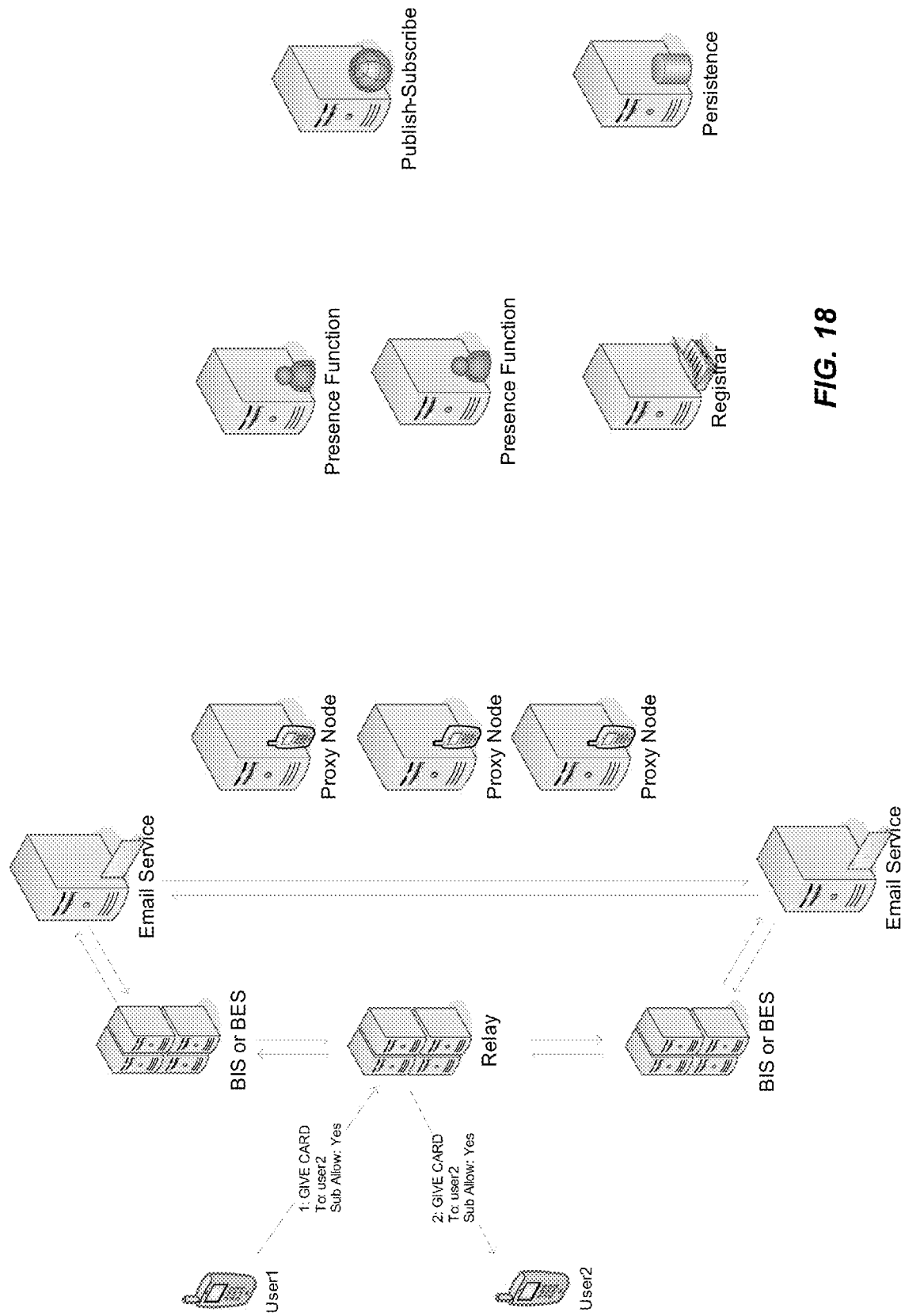
FIG. 18 schematically depicts how an electronic (virtual) business card can be shared, for example, as a vCard e-mail attachment.

FIG. 18 schematically depicts how an electronic (virtual) business card can be shared, for example, as a vCard e-mail attachment. This figure illustrates, by way of example, one particular way in which a user could give their electronic or virtual business card to another user as a vCard e-mail attachment. It is appreciated that vCard is used solely by way of example, and that a business card of another format or type could also be exchanged or shared in the same manner.

It is possible to allow users to exchange business cards using other methods such as via an Instant Messaging session or through other means.

Figure 19:
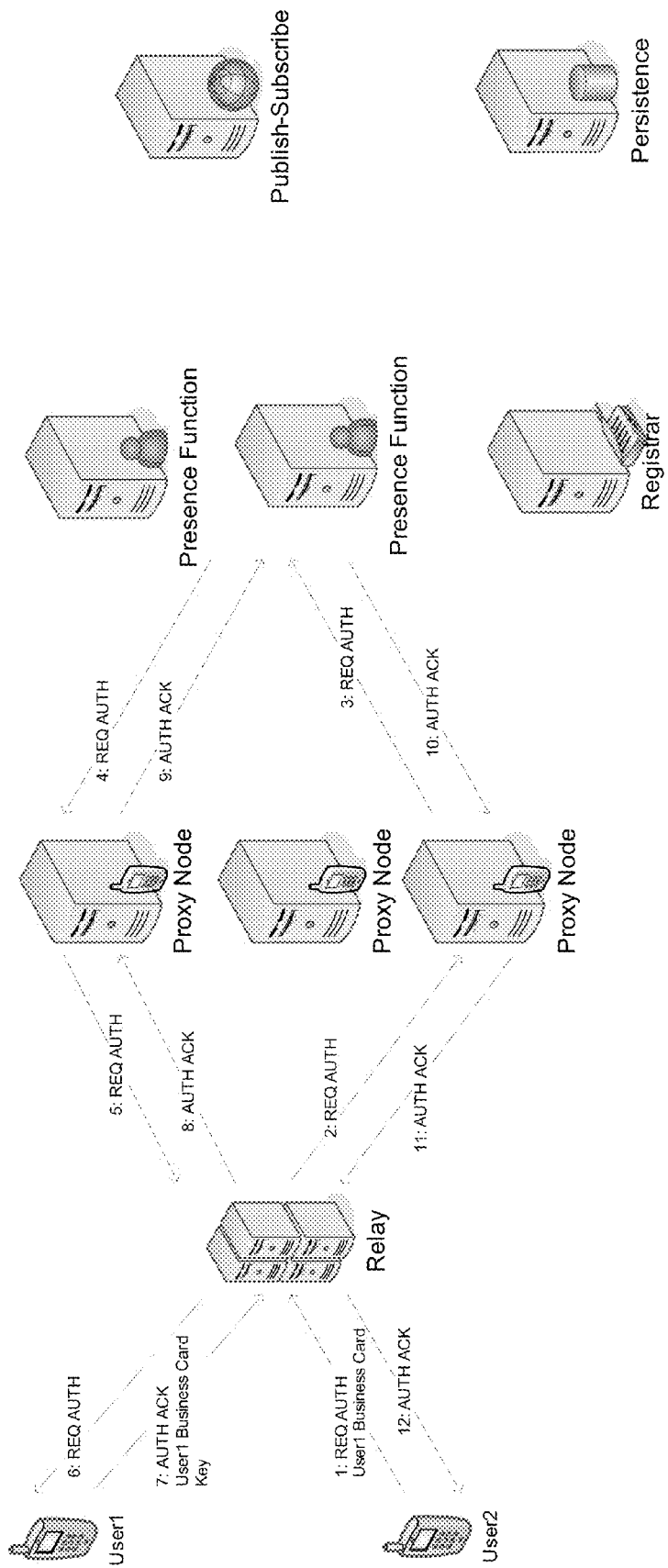
FIG. 19 schematically depicts how a user can receive an electronic business card and request authorization to subscribe to the electronic business card so as to automatically receive subsequent changes to the electronic business card.

FIG. 19 schematically depicts how a user can receive an electronic business card and request authorization to subscribe to the business card so as to automatically receive subsequent changes to the business card. When a user receives a business card from another user, the recipient user may be offered the choice to subscribe to changes to the business card information. If the recipient user accepts the offer to subscribe, an authorization procedure is initiated. In this figure, User2 requests authorization to subscribe to changes in User1's business card. The messages involved in this procedure are exchanged as peer-to-peer (p2p) messages in the presence protocol. As part of the authorization procedure, User1 shares an encryption key with User2 to enable decryption of the business card information.

Figure 20:
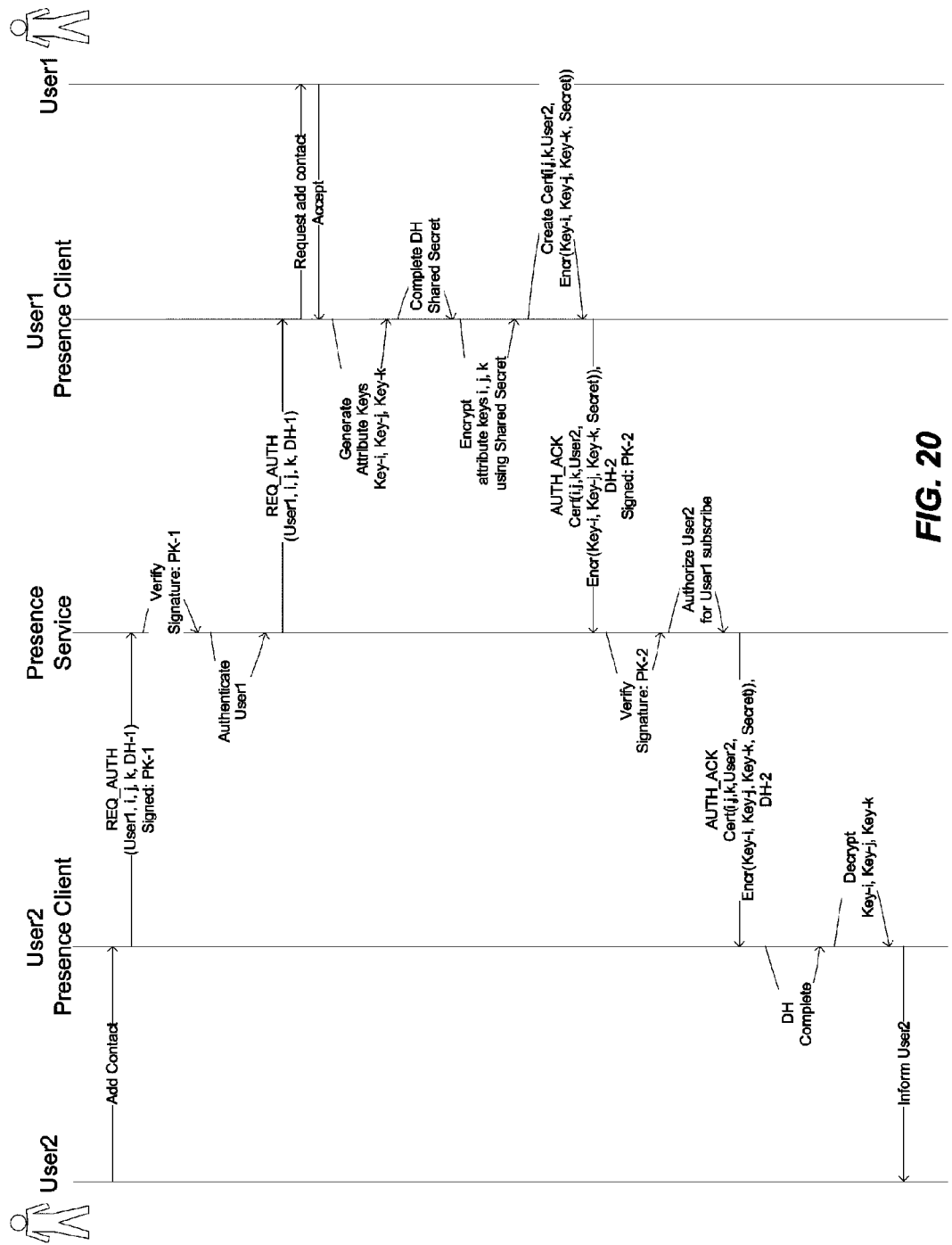
FIG. 20 presents a message sequence for the authorization procedure of FIG. 19.

FIG. 20 presents a detailed message sequence for the authorization procedure of FIG. 19. When the authorization procedure is completed, User2 may proceed to create a subscription.

Figure 21:
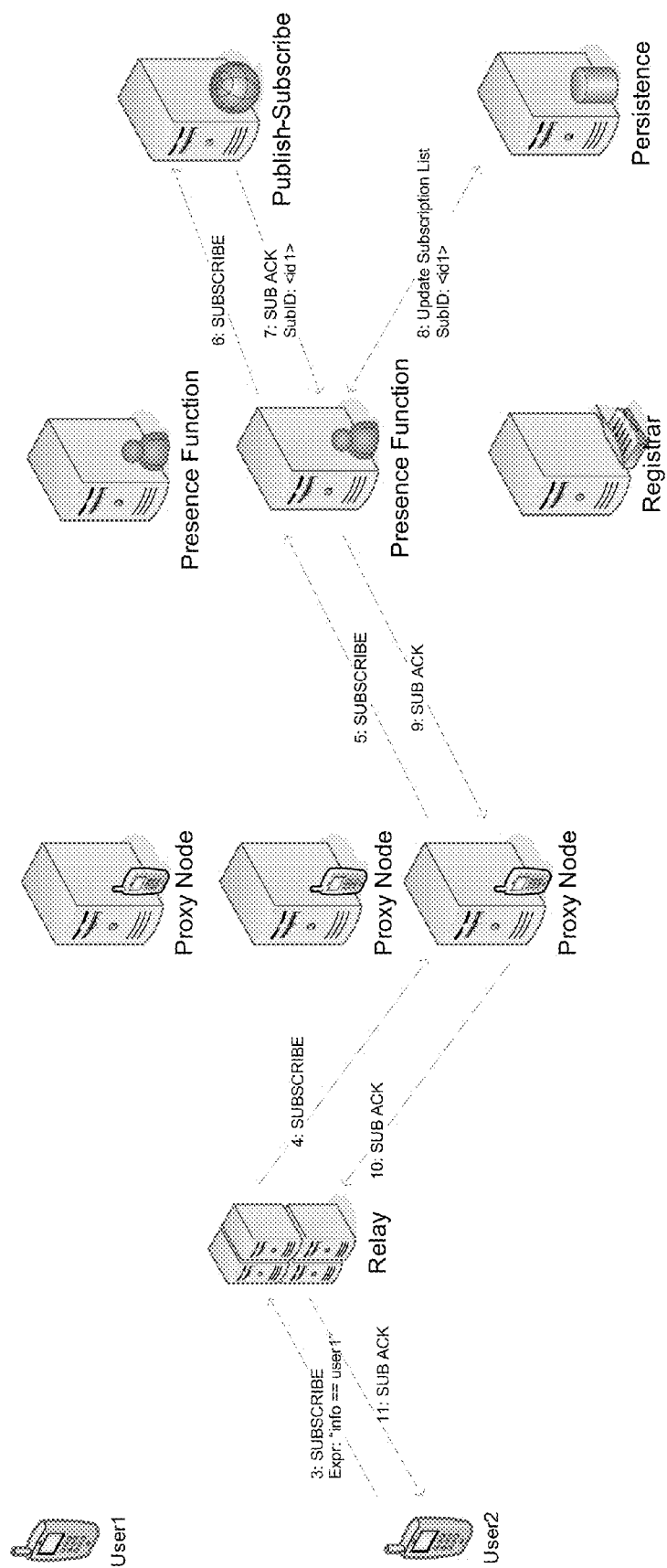
FIG. 21 schematically depicts a subscription message flow for subscribing to an electronic business card whereby, upon completion of this procedure, a subscription will have been created in a publish-subscribe subsystem and a record of the subscription will be saved in a persistent data store.

FIG. 21 schematically depicts a subscription message flow for subscribing to a business card whereby, upon completion of this procedure, a subscription will have been created in a publish-subscribe subsystem (i.e. in the Pub-Sub Core) and a record of the subscription will be saved in a persistent data store.

Figure 22:
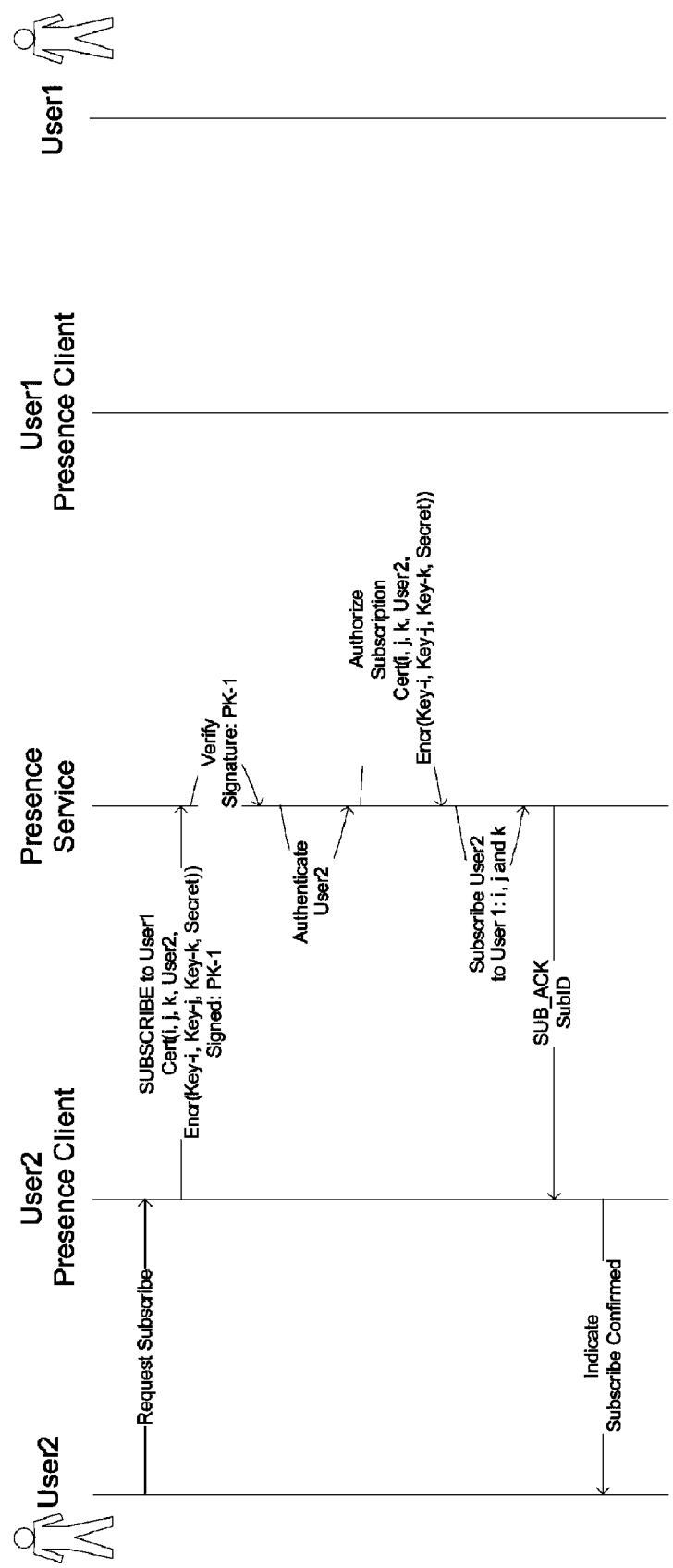
FIG. 22 presents a message sequence for the subscription procedure of FIG. 21.

FIG. 22 presents a complementary message sequence for the subscription procedure of FIG. 21. As depicted in this figure, when User2 requests a subscription, a SUBSCRIBE message is sent from User2's presence client to the presence service which verifies the signature, authenticates User2, authorizes the subscription, subscribes User2 to User1, and then sends a subscription acknowledgement (SUB-ACK) with a subscription ID (SubID) back to User2's presence client, which indicates to User2 that the subscription process has been completed. An authorized subscription relationship is thus established between User1 and User2.

Figure 23:
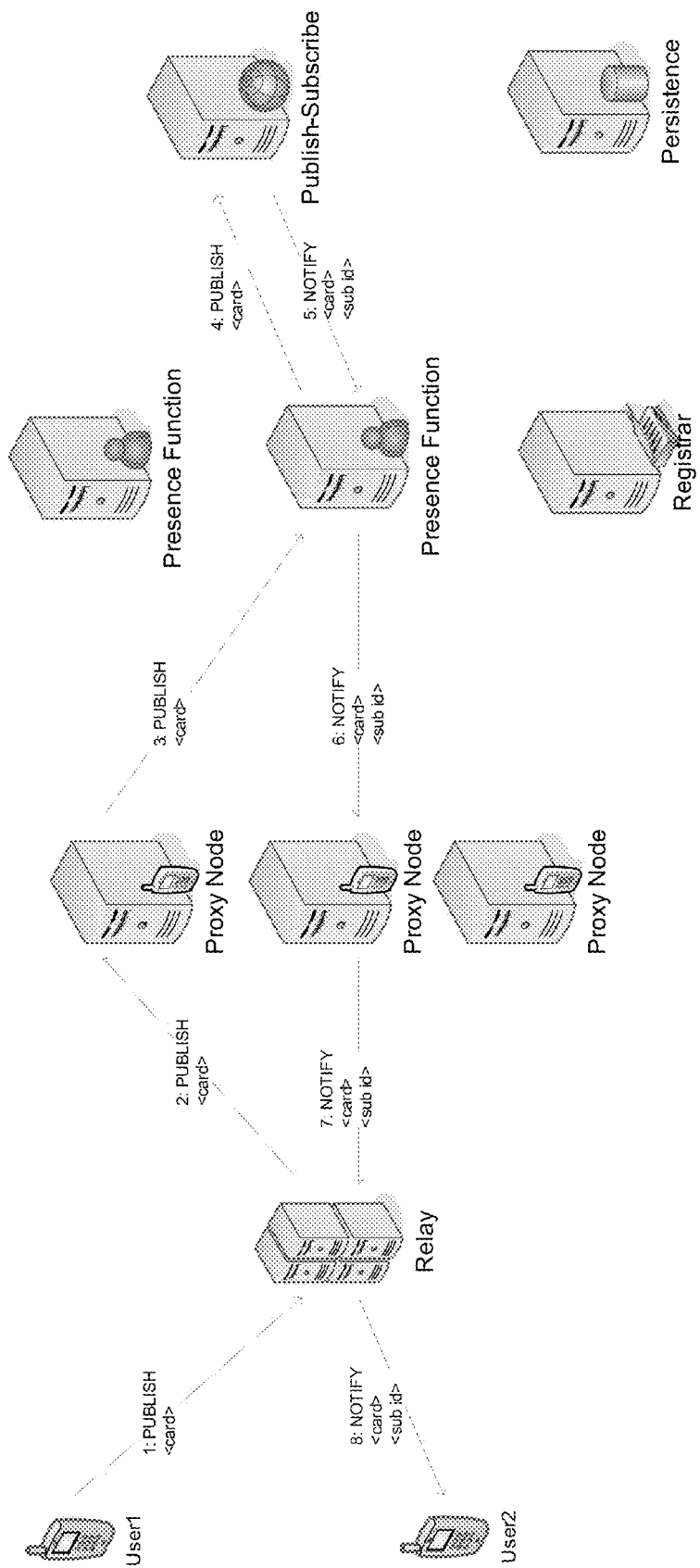
FIG. 23 schematically depicts a message flow for updating/publishing changes made to an electronic business card.

FIG. 23 schematically depicts a message flow for updating/publishing changes made to an electronic or virtual business card. As depicted in FIG. 23, the process of updating a business card is initiated when User1 publishes a change to the card (1:PUBLISH <card>) from, for example, a mobile device to a relay. The relay passes along the update message (2: PUBLISH <card>) to a proxy node which forwards the update message (3: PUBLISH <card>) to a presence function server which, in turn, forwards the message (4: PUBLISH <card>) to a Publish-Subscribe server (part of the Pub-Sub Core). The Publish-Subscribe server replies with a notify message (5: NOTIFY <card>, <sub id>) to the presence function node which forwards the message (6: NOTIFY <card>, <sub id>) to a different proxy node which, in turn, sends the notification message (7: NOTIFY <card>, <sub id>) to the relay. The relay then communicates the notification message (8: NOTIFY <card>, <sub id>) to User2's device.

Publication, Notification and Subscription Management

Figure 24:
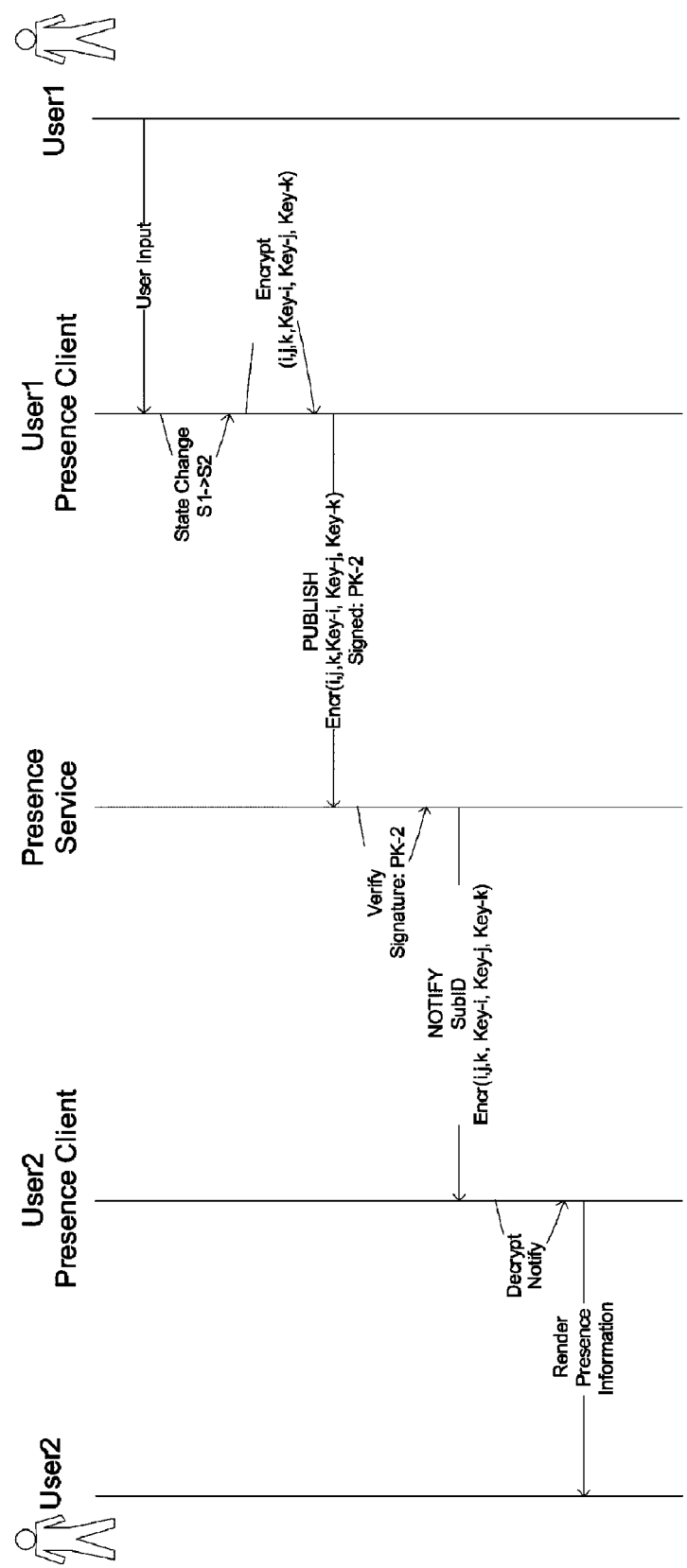
FIG. 24 presents a message sequence for the publish-notify procedure of FIG. 23.

FIG. 24 presents a message sequence for the publish-notify procedure of FIG. 23 or for any other situation when a first user (User1) publishes new presence information or a status change in existing presence information for which a second user (User2) has a subscription. As shown in FIG. 24, user input from User1 (or any automatically generated sensor data from User1's device) causes a state change at the User1 presence client. User1's presence client encrypts the state change and publishes this to the presence service which verifies the signature and, assuming the signature is valid, notifies the User2 presence client by sending the subscription ID and the encrypted state change which the User2 presence client can decrypt. The presence information (state change) can then be made available (e.g. displayed) to User2.

Figure 25:
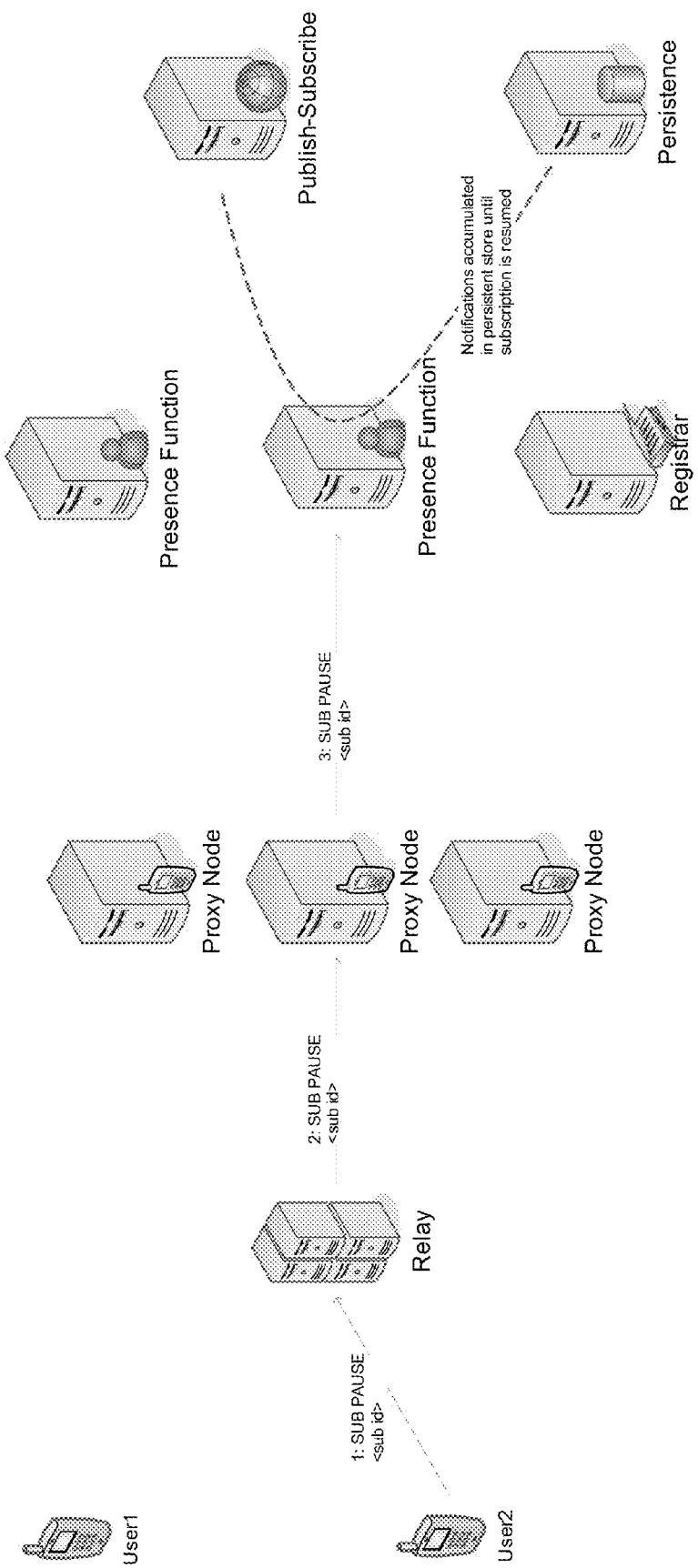
FIG. 25 schematically depicts a message flow for pausing an electronic business card subscription.

FIG. 25 schematically depicts a message flow for pausing (suspending) a subscription, e.g. a subscription for presence information or, alternatively, a subscription to another person's business card. This figure shows an example in which User2 communicates a pause subscription message (SUB PAUSE <sub id>) to the relay which, in turn, sends a pause subscription message containing the subscription ID to a proxy node. The proxy node sends a pause subscription message (also with the subscription ID) to a function node (server) in the functional tier. Thereafter, as shown in the example presented in FIG. 25, notifications are merely accumulated in the persistent data store until the subscription is resumed. In this implementation, it is the function node that acts as gatekeeper by determining which notifications to forward to the proxy node and which are to be routed to the persistent data store.

Suspending a subscription may be done manually or automatically. Manually suspending a subscription may, for example, be done by receiving input on a user input device that indicates that the user wishes to suspend a subscription. Automatically suspending a subscription may, for example, entail programming or pre-configuring the device (or, more specifically, the presence client that executes on the device) to send the suspend/pause subscription message upon satisfaction of one or more predetermined criteria, hereafter referred to as suspension-triggering conditions. These suspension-triggering conditions may be, for example, time-based conditions and/or location-based conditions. These suspension-triggering conditions can be defined to pause a single subscription or a group of subscriptions.

In one implementation, the suspension-triggering conditions suspend the subscription indefinitely until a resumption-triggering condition is met, even if the suspension-triggering condition ceases to be met. In other words, the indefinite or open-ended suspension-triggering condition requires a resumption-triggering condition to affirmatively resume the subscription. (Resumption-triggering conditions are described in detail in the paragraphs below that reference FIG. 26.) In another implementation, the suspension-triggering condition implicitly contains its own default resumption condition, i.e. with a definite or self-contained suspension-triggering condition, the subscription is automatically resumed when the suspension-triggering condition is not longer met.

Time-based suspension-triggering conditions can be defined to pause a subscription starting at any time, day, week, month or year.

For indefinite time-based suspension-triggering conditions, the subscription is paused indefinitely when the current time reaches a prescribed temporal condition, e.g. the subscription is paused indefinitely as of 5:45 p.m. on Friday, Oct. 31, 2009. As this condition is indefinite (open-ended), the subscription will not resume unless a specific, affirmative resume message is received.

For definite time-based suspension-triggering conditions, the subscription can be paused for any period of time, e.g. for a specific day, week, month, year, etc. These definite time-based suspension-triggering conditions thus act as timers for suspending and resuming subscriptions. For example, the device may be configured to automatically send a message to suspend a subscription for a business contact if the current time is not between 9 a.m. and 5 p.m. or if the current day is not Monday to Friday (i.e. during regular business hours).

Location-based suspension-triggering conditions can be defined for a specific geographical location, such as a continent or group of continents, country or group of countries, state/province/district or group of states/provinces/districts, or any city, town or municipality or group of cities, towns or municipalities, etc. The location-based condition may also be the entry into, or exit from, any customized region defined in terms of coordinates of latitude and longitude, graphical bounding box, etc. For example, the device may be automatically configured to send a message to suspend a subscription if the current location is outside North America.

These location-based conditions may also be indefinite or definite. If the condition is indefinite, the subscription is suspended upon satisfaction of the condition (e.g. leaving North America) even if the device subsequently no longer satisfies the triggering condition (e.g. the device returns to North America). A subscription-resumption message (triggered either manually or automatically upon satisfaction of a resumption condition) is required to resume the subscription. If the condition is definite, on the other hand, the subscription is automatically resumed when the triggering condition ceases to exist, e.g. as soon as the device returns to North America.

Time-based and location-based suspension-triggering conditions may be used conjointly. As an example, the device may be automatically configured to send a message to suspend a subscription if the current time is between 1 a.m. and 5 a.m. and if current location corresponds to Barcelona, Spain.

In addition to time-based and location-based suspension-triggering conditions, the subscriptions may be suspended (paused) based on any other conditions such as, for example, the device's battery strength, current network congestion, current CPU usage, etc. For example, if the device is running low on battery, the device may be configured to automatically suspend subscriptions to minimize the amount of data being received over the air.

The device may also be configured to enable all subscriptions to be suspended (a "suspend all subscription" feature). This feature may be triggered manually or automatically upon satisfaction of a predetermined criterion or condition. Such a feature would be useful, for example, to a person who is going on vacation and wishes to efficiently suspend all subscriptions (without having to individually suspend each subscription).

Figure 26:
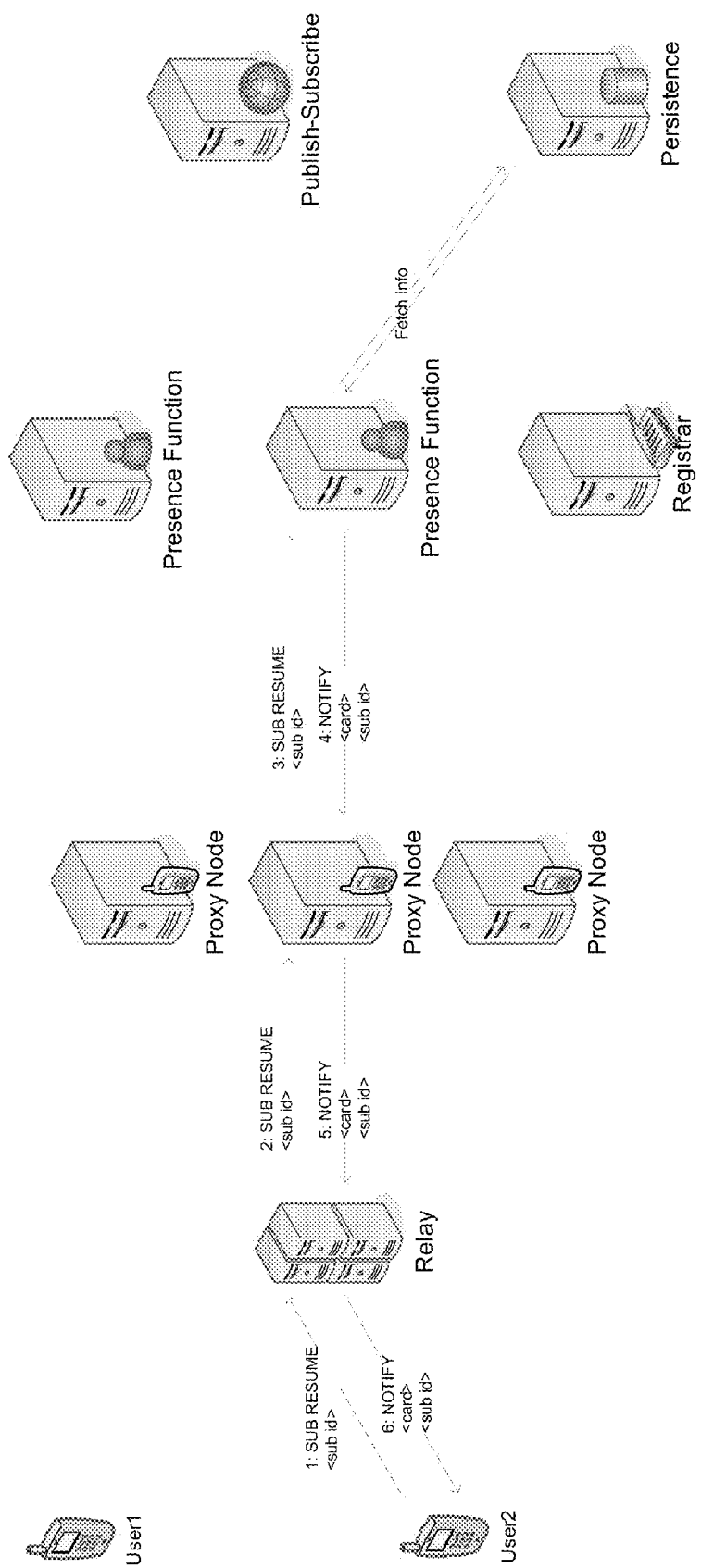
FIG. 26 schematically depicts a message flow for resuming an electronic business card subscription.

FIG. 26 schematically depicts a message flow for resuming a subscription, i.e. restarting a subscription that had been previously suspended. As depicted in this further example, the subscription can be resumed when User2 communicates a subscription resume message (SUB RESUME <sub id>) containing an identification of the particular subscription that is to be resumed to the relay which communicates the subscription resume message to a proxy node. When the proxy node communicates the subscription resume message to the function node (server) in the functional tier, the function node (server) fetches from the persistent data store the presence information that has accumulated while the subscription was suspended. The function node also notifies the proxy node with a notification message (NOTIFY <card>, <sub id>), i.e. sends back a response to notify the watcher that the subscription has been suspended. The proxy node communicates this response (notification message) to the relay which, in turn, forwards the response (notification message) to the User2 device.

Resuming a subscription may be done manually or automatically, analogously to the procedure for suspending a subscription. Manually resuming a paused subscription may, for example, be done by receiving input on a user input device that indicates that the user wishes to resume a currently suspended subscription. Automatically resuming a subscription may, for example, entail programming or pre-configuring the device to send the resume subscription message upon satisfaction of one or more predetermined criteria, hereafter referred to as subscription-resumption-triggering conditions or simply resumption conditions. These resumption conditions may be, for example, time-based conditions and/or location-based conditions. These resumption conditions can be defined to resume a paused subscription (or to resume a related group of paused subscriptions).

Time-based resumption conditions can be defined to resume a suspended subscription at any particular time, day, week, month, year, etc. A suspension-triggering condition can be used in conjunction with a resumption condition to act as a timer for suspending and resuming subscriptions. For example, a subscription may be paused on June 10 and resumed August 15.

Location-based resumption conditions can also be defined in terms of a specific geographical location, such as a continent or group of continents, country or group of countries, state/province/district or group of states/provinces/districts, or any city, town or municipality or group of cities, towns or municipalities. The location-based condition can also be the entry into, or exit from, any customized region defined in terms of coordinates of latitude and longitude, graphical bounding box, etc. For example, the device may be automatically configured to send a subscription resumption message to resume a paused subscription only when the current location of the device is within the city limits of Montreal. It is to be noted that the location condition that triggers suspension of the subscription may be different from the location condition that causes resumption of the subscription. For example, the subscription may be suspended when the device arrives in Paris and resumed only when the device arrives in Rome.

Time-based and location-based resumption conditions may also be used conjointly. As an example, the device may be configured to automatically send a message to resume a paused subscription if the current time is between 11 a.m. and 4 p.m., the current day is Tuesday, the current month is July and if a current location corresponds to Ottawa, Canada.

In addition to time-based and location-based conditions, paused subscriptions may be resumed based on any other conditions such as, for example, renewed battery strength above a predetermined threshold, diminution in network congestion below a predetermined threshold, CPU usage below a predetermined threshold, etc.

Resuming subscriptions may be accomplished individually, by manually or automatically sending a resume message for each specific subscription. The device may also be configured to enable all currently paused subscriptions to be resumed. A "resume all subscriptions" feature may be manually selected to generate subscription-resumption messages for each paused subscription. This feature may be useful for a person who has returned from vacation and wishes to resume all of his or her subscriptions. Similarly, the resume-all-subscriptions feature may be activated upon satisfaction of one central condition that triggers the sending of resumption messages for all subscriptions.

In the specific implementation depicted by way of example in FIG. 26, the function node fetches old notifications that have accumulated in the persistent data store when the subscription is resumed. In another implementation, notifications are not stored but simply discarded. In another implementation, the notifications may be accumulated only for a certain amount of time before being purged. In another implementation, the user (watcher) may be queried, upon resumption of a subscription, as to whether he or she wishes to receive the old accumulated notifications.

In yet another implementation, the presence client executing on the device may include settings, preferences or options for determining whether to retain or discard notifications while the subscription is paused, how long to retain notifications before being purged, or which types of notifications are to be retained or purged. These settings or preferences may be communicated to the presence service in the resumption message.

In yet another implementation, the device may instruct the presence service to transfer the old notification data or a subset thereof from the persistent data store to a remote data store for archiving.

Switching Devices

Occasionally, a user will switch devices (e.g. upgrade his or her mobile device to a newer model). There are two key scenarios relating to the switching of devices.

Figure 27:
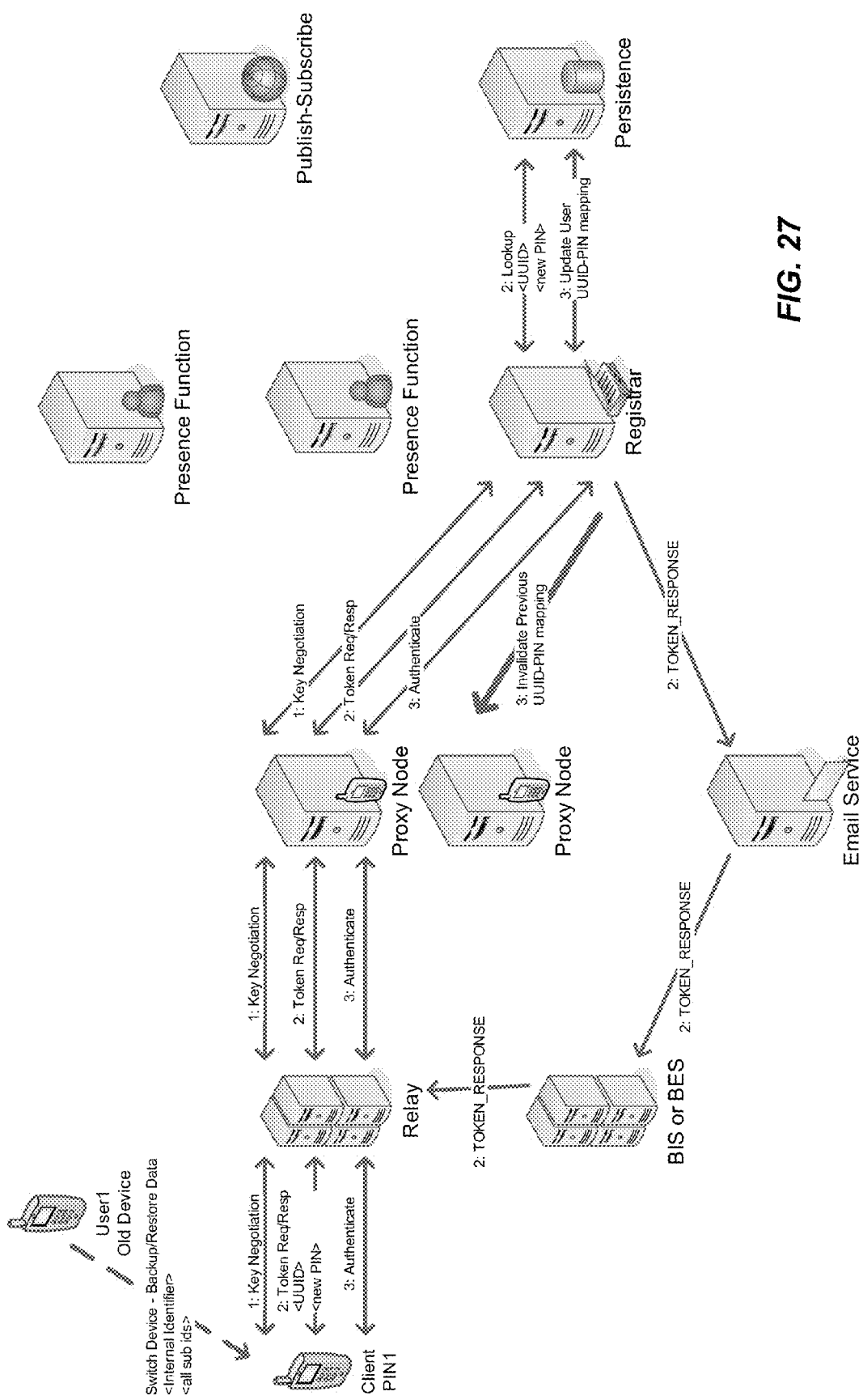
FIG. 27 schematically depicts a message flow for a backup/restore procedure when a user switches devices.

In the first scenario, an up-to-date (fresh) copy of the old device's data is copied to the new device via a backup/restore procedure. FIG. 27 schematically depicts a message flow for a backup/restore procedure when a user switches from an old device to a new device. Following the backup/restore procedure, the new device possesses all of the necessary data to resume normal operation with the presence service. User1 may then re-run the presence registration procedure to update the UUID-mobile device identifier mapping in persistent data store as shown in FIG. 27. The procedure is similar to the new registration scenario except that in this case the new device includes the user's UUID in the token request/response procedure to inform the presence service that the user is already a registered user.

Figure 28:
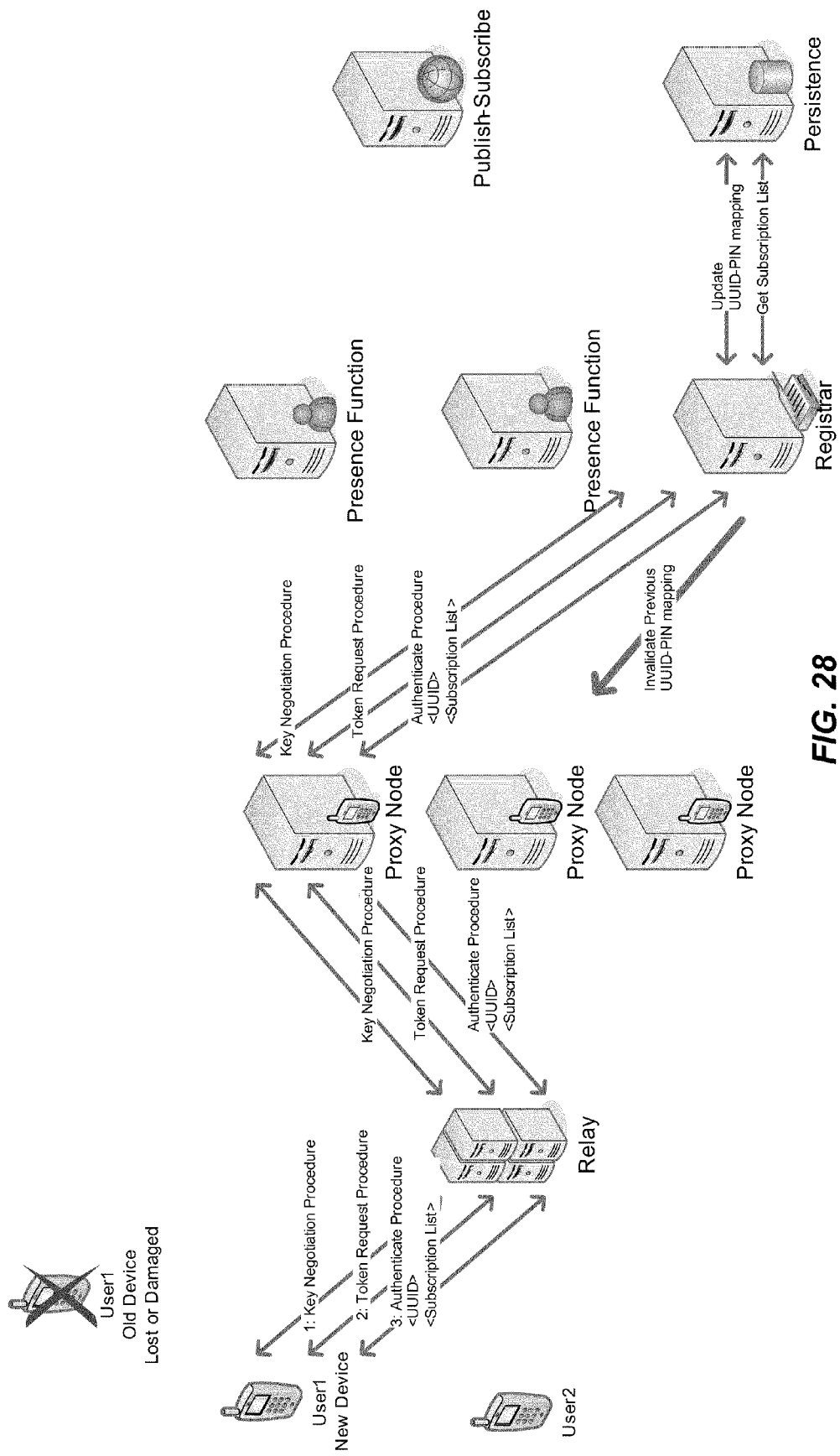
FIG. 28 schematically depicts a message flow for a re-registration process when a user switches devices but a current backup of the data from the old device is unavailable.

In the second scenario, a current backup of the data from the old device is unavailable. This might happen, for example, if the old device was lost or damaged. FIG. 28 schematically depicts a message flow for a re-registration procedure when a user switches devices but a current backup of the data from the old device is unavailable. This figure illustrates a scenario in which User1 switches to a new device but a current backup of the data from the old device is not available. To become operational with the presence service again the user has the e-mail address previously selected as the user identifier directed to the new device and executes the presence registration procedure using the same e-mail address previously selected as the user identifier. The presence registrar recognizes the user as having been previously registered (by identifying the user by his previous e-mail address) and delivers the user's UUID and subscription list the new device.

Figure 29:
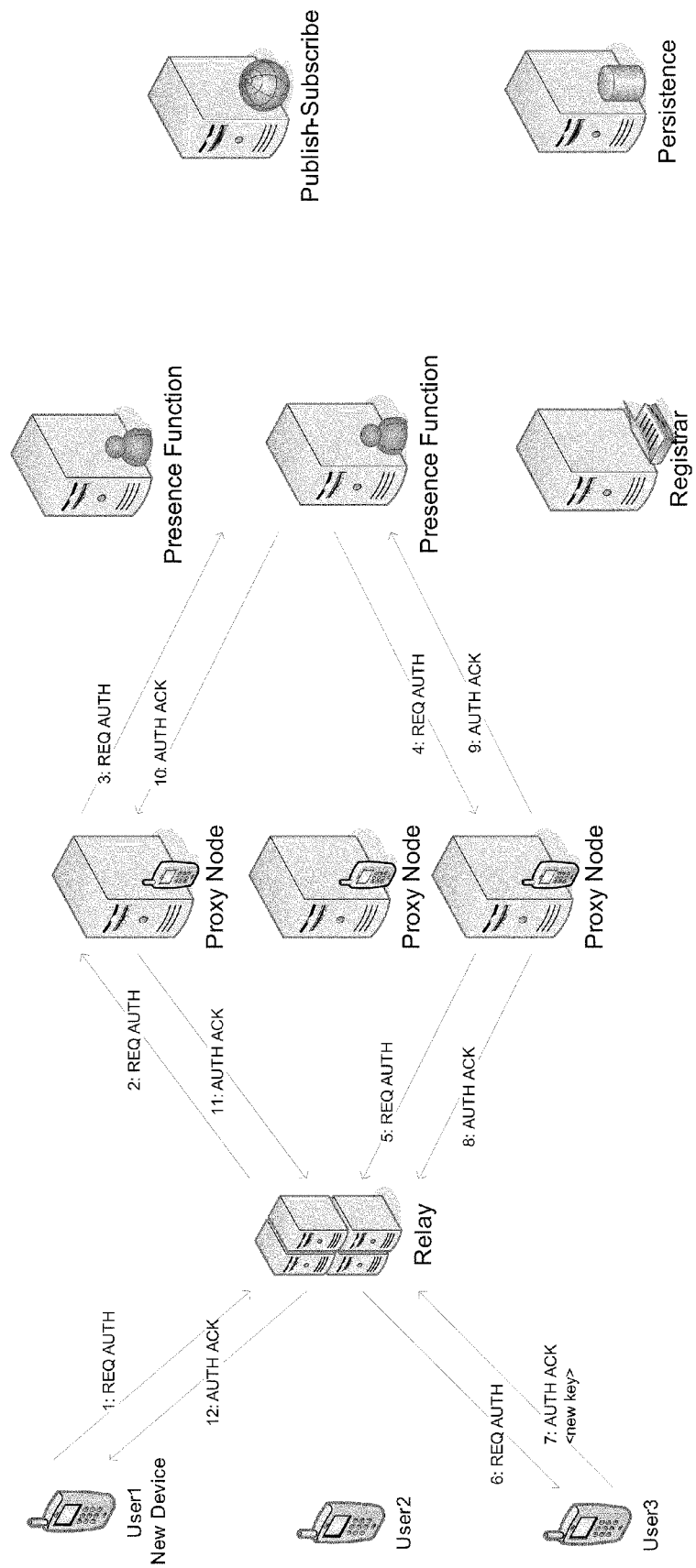
FIG. 29 schematically depicts a message flow when a user, upon switching devices and re-registering, requests re-authorization and new keys from each contact.

FIG. 29 schematically depicts a message flow when a user, upon switching devices and re-registering, requests re-authorization and new keys from each contact.

Figure 30:
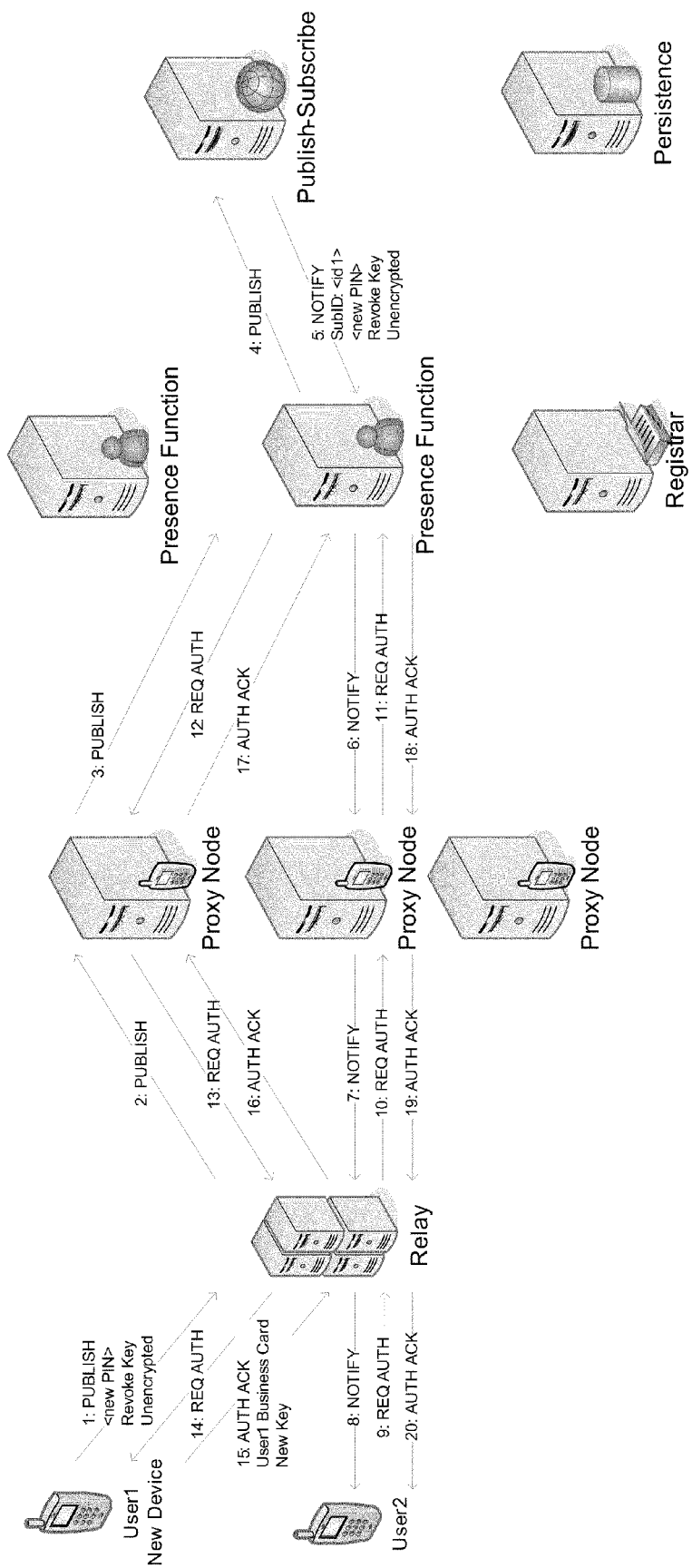
FIG. 30 schematically depicts a message flow when a user, upon switching devices, revokes and re-issues keys to all watchers.

Using the subscription list obtained from the re-registration procedure the user may request re-authorization and new keys from each contact. Existing subscriptions are in place and active so there is no need to create new subscriptions or to modify existing subscriptions. If authorization is not granted then subscriptions should be removed to avoid receiving unwanted notifications. The next step is thus to revoke authorization and encryption keys that have been given to other contacts. This will trigger those contacts to request re-authorization and obtain new keys as shown in FIG. 30. In other words, the authorized subscription relationship is temporarily severed and then re-established.

FIG. 30 schematically depicts how keys can be revoked and reissued to various watchers when a user switches devices. A message that is specifically formatted to match the subscription criteria of subscribed contacts is published. Since User1's device no longer knows the keys that were previously shared with the subscribed contacts the message can not be encrypted. The message contains User1's user identifier (i.e., email address), the mobile device identifier of User1's new device and an indication that previously shared keys are revoked.

All subscribed contacts will receive notifications containing the message from User1. If the subscribed contact so wishes, these contacts may request re-authorization and new keys from User1.

The presence system described above can be used with any networked computing device or communications device, including, personal computers, laptops, tablets, wireless communications devices (including PDAs, smart phones, cell phones, or any other type of mobile phone). Although the presence technology can be used with a static computing device, it is particularly useful when utilized in conjunction with mobile devices that are equipped with location-determining subsystems such as, for example, Global Positioning System (GPS) receivers as this provides location-based presence information.

Figure 31:
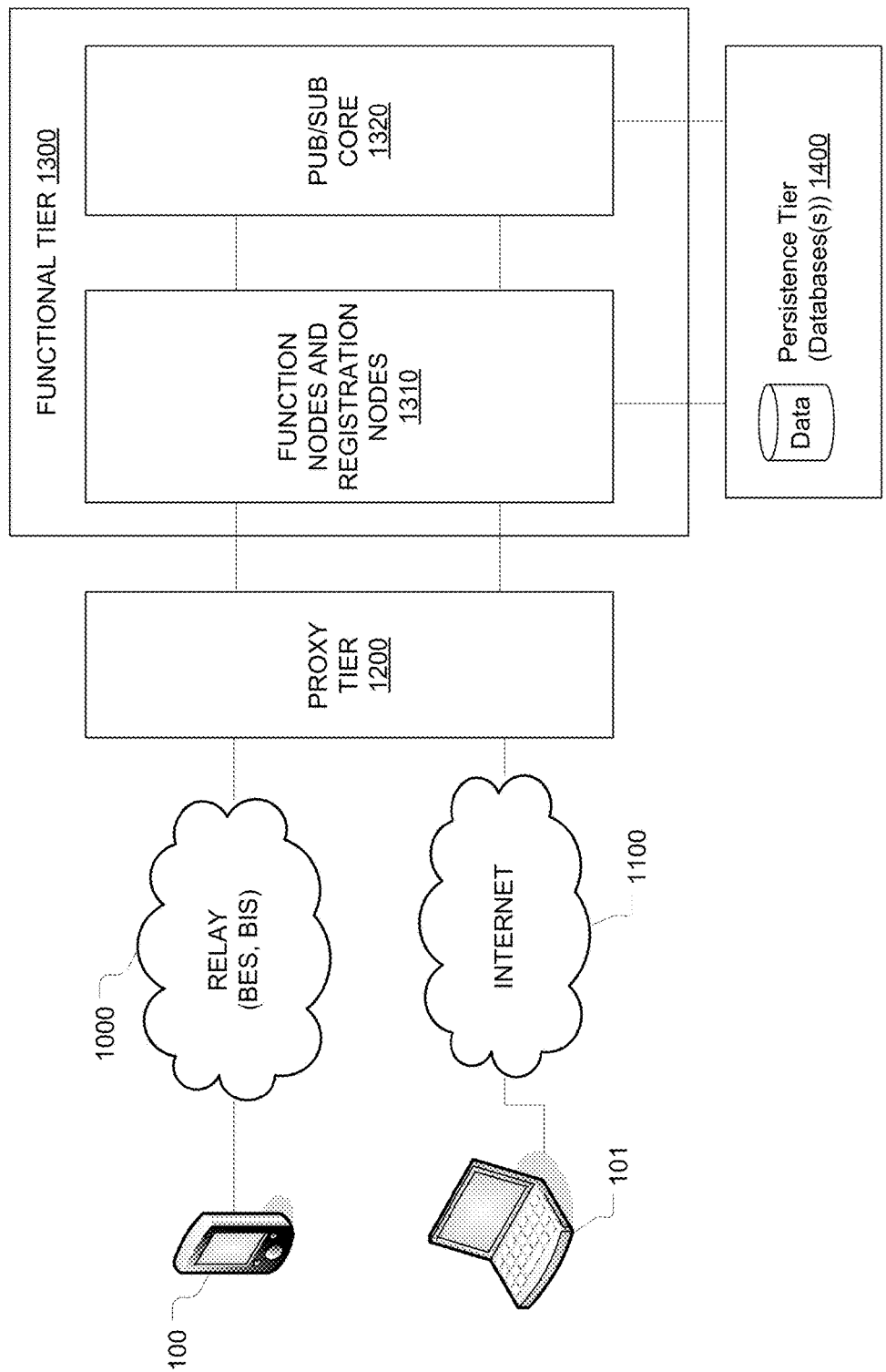
FIG. 31 schematically depicts how the presence system can interact with both a wireless client via a mobile network infrastructure and a wired client via a standard internet connection.

FIG. 31 schematically depicts how the presence system can interact with both a wireless client 100 via a mobile network infrastructure 1000 and a wired client 101 via a standard internet connection 1100. The mobile network infrastructure 1000 and the internet connection 1100 are linked to one of a plurality of proxy nodes of the proxy tier 1200 depending on the location of the clients 100, 101. The proxy nodes act as routers to route messages such as subscription-suspension messages and subscription-resumption messages from the various user devices (clients 100, 101) to a predetermined (pre-assigned) function node 1310 with which the device has previously established a binding. The function node 1310 that receives the subscription-suspension message processes this subscription-suspension message to identify a subscription associated with the subscription-suspension message. The function node 1310 then suspends the subscription by blocking and re-routing to the persistent data store 1400 all of the notifications that would, in the normal course, be forwarded to the watcher's device if the watcher's subscription were active or in effect (i.e. not suspended).

As further depicted in FIG. 31, the function node 1310 is part of the functional tier 1300. The functional tier 1300 also includes a publish-subscribe subsystem (Pub-Sub Core 1330) enabling presentities to publish presence information and watchers to subscribe to presence information. The publish-subscribe system generates and forwards all notifications to the function node irrespective of whether the subscription is active (in effect) or inactive (suspended).

The persistent data store 1400 is not only accumulates (stores) notifications from the publish-subscribe subsystem 1330 during the period that a subscription has been suspended or paused but also stores other information as well. For example, the persistent data store 1400 may also store generally invariable user identification data and a mapping that links each user (via, e.g. a universally unique ID) to each device (via, e.g. a mobile device identifier number associated with the device such as, for example, an International Mobile Equipment Identity (IMEI) number which uniquely identifies a GSM, UMTS, LTE or iDEN mobile device or a Mobile Equipment Identifier (MEID) which uniquely identifies a CDMA mobile device).

While it is advantageous to implement the presence system in the manner illustrated in this figure, i.e. with proxy nodes decoupled from function nodes and with function nodes decoupled from the publish-subscribe subsystem, it is also possible to combine one or more of the nodes depicted in this figure into one or more multi-functional nodes. It should also be appreciated that the additional (backup) nodes may be inserted to provide network redundancy and resiliency.

In one implementation of this exemplary system, the proxy node is configured to route the message relating to presence information based on an identity of the presence client (i.e. which user it is) and a specific application identified in the message.

In one implementation of this exemplary system, the publish-subscribe subsystem 1330 employs independently operable publication and subscription servers, i.e. the publication server(s) and the subscription server(s) function independently of each other. Accordingly, data content can be published even if no matching subscription exists. Likewise, a subscription can be created even if no matching data content has yet been published. For example, a user can publish presence information about himself using any arbitrary descriptors (which need not be pre-defined). Likewise, a watcher can define a subscription expression using any arbitrary language even if there is no published data content relevant to the subscription expression.

The novel presence system disclosed herein is predicated upon a content-based model in which subscribers express their interest by specifying conditions over the content of events they want to receive. A subscription is a query formed by a set of constraints usually in the form of name-value pairs of properties and basic comparison operators ($=, <<=, >, >=$) which identify valid events. A constraint may also be of the form of a regular expression.

In content-based publish-subscribe systems, events are not classified according to pre-defined criteria, but rather according to properties of the events themselves. Hence the correspondence between publishers and subscribers is on a per-event basis. The higher expressive power of a content-based system comes at the price of higher consumption of resources needed to calculate the set of interested subscribers for the each event.

Because a content-based publish-subscribe system inspects the content of each event in order to match with subscriptions, it is not possible to support full end-to-end encryption of the content of events. The content is temporarily decrypted while matching is performed. In a variant, however, it is possible to assign labels or descriptors to encrypted content to enable the system to identify the encrypted content by its label and to communicate the encrypted content without decrypting it until it reaches the watcher (who has been previously given the specific key to decrypt the encrypted content).

Figure 32:
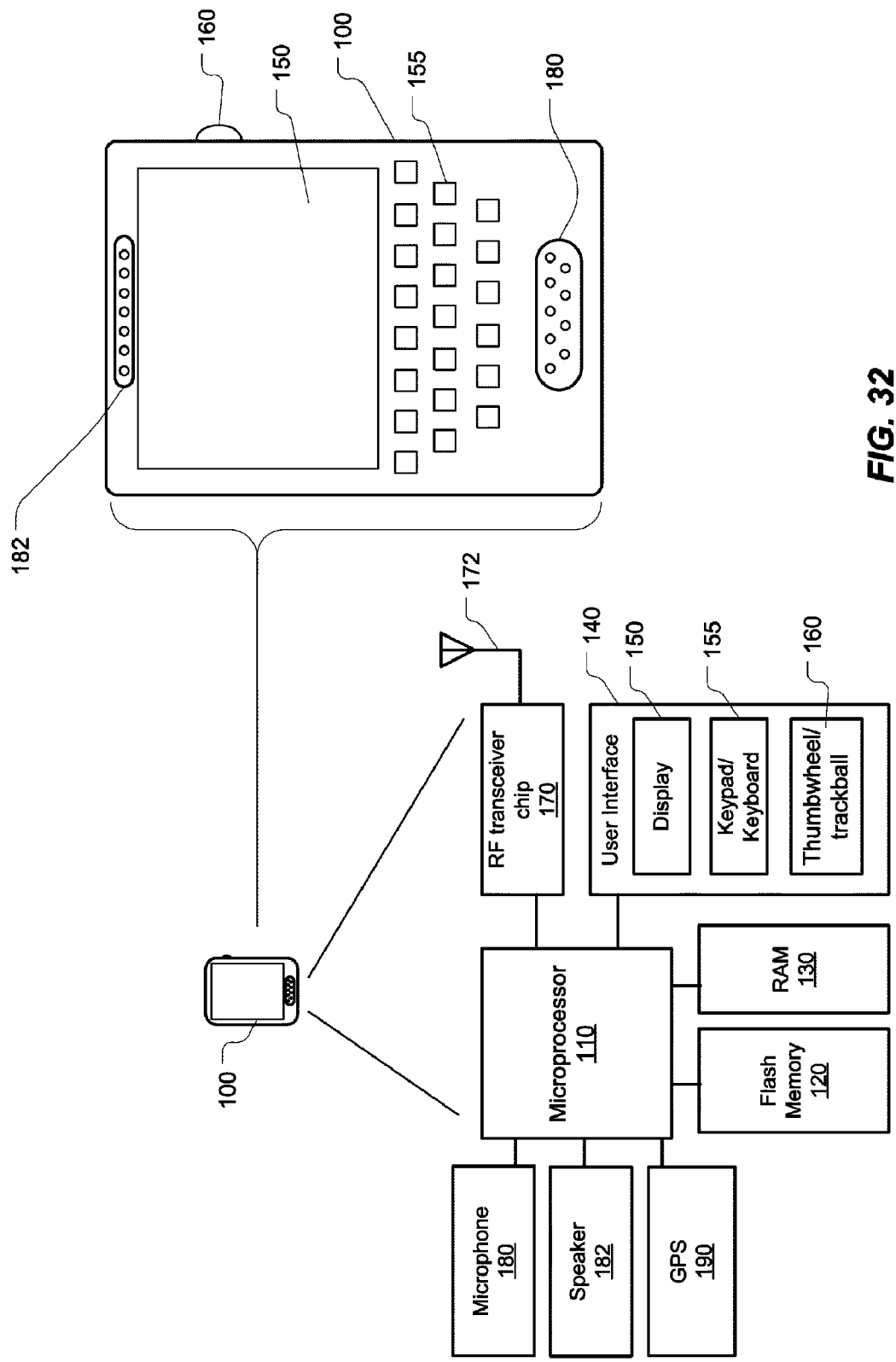
FIG. 32 is a schematic depiction of a wireless communications device that can be used to interact with the presence system.

FIG. 32 depicts schematically a wireless communications device 100 which can be used to manage a subscription to presence information in accordance with another aspect of the present technology. For the purposes of this specification, the expression "wireless communications device" is meant to encompass a broad range of electronic communication devices that have microprocessors and memory and which are capable of wireless ("over-the-air") communication. Accordingly, "wireless communications device" is meant to encompass wireless-enabled laptops, tablet PCs, portable, handheld or mobile electronic devices such as smart phones, cell phones, satellite phones, and wireless-enabled PDA's, etc., or any hybrid or multifunction device that has a radio-frequency (RF) transceiver.

Referring to FIG. 32, each wireless communications device 100 includes a microprocessor 110 or central processing unit (or simply a "processor") and a memory for storing data. The memory may include both a Flash memory 120 and a random access memory (RAM) 130. Each wireless communications device 100 also has a user interface 140 that includes a display (graphical user interface—GUI) 150, e.g. an LCD screen, a keyboard/keypad 155 and an optional thumbwheel/trackball 160. In lieu of a keyboard/keypad, the device may include a touch-sensitive screen. Each wireless communications device 100 includes an RF transceiver chip 170 for wireless communications, i.e. receiving and transmitting both voice and data over separate channels using technologies such as GSM/UMTS/LTE, CDMA, GPRS, EDGE, etc. For optional voice communications, the wireless communications device 100 has a microphone 180 and a speaker 182.

In addition, as shown schematically in FIG. 32, the wireless communications device 100 may include a Global Positioning System (GPS) chipset for obtaining position fixes from orbiting GPS satellites. References to GPS are meant to also include Assisted GPS or Aided GPS.

Although the present disclosure refers expressly to the "Global Positioning System" or "GPS", it should be understood that the term "GPS" is being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system. In lieu of, or in addition to, GPS, the wireless communications device may use another type of location-determining subsystem. Although GPS is the best way presently known for obtaining a current position fix, a different type of positioning subsystem or location-determining subsystem can be used, e.g. a radiolocation subsystem that determines its current location using radiolocation techniques, as will be elaborated below. In the main implementation, though, the GPS chipset 190 receives and processes signals from GPS satellites to generate latitude and longitude coordinates, thus making the device "location aware".

In lieu of, or in addition to, GPS coordinates, the location of the device can be determined using triangulation of signals from in-range base towers, such as used for Wireless E911. Wireless Enhanced 911 services enable a cell phone or other wireless device to be located geographically using radiolocation techniques such as (i) angle of arrival (AOA) which entails locating the caller at the point where signals from two towers intersect; (ii) time difference of arrival (TDOA), which uses multilateration like GPS, except that the networks determine the time difference and therefore the distance from each tower; and (iii) location signature, which uses "fingerprinting" to store and recall patterns (such as multipath) which mobile phone signals exhibit at different locations in each cell. Other location-determining techniques (of varying granularity) can also be employed for the purposes of providing location-related presence data, such as, using the identity of the nearest base station, accessing data stored in a Home Location Register/Visitor Location Register (HLR/VLR), etc.

Irrespective of the location-determining technique that is employed, a wireless communications device with a location-determining subsystem, e.g. GPS chipset, can be configured to determine its current location and compare its current location against the location-based triggering conditions for suspending or resuming a subscription. A presence client executing on the wireless communications device can be programmed to generate a subscription-suspension message based on this triggering condition (or, alternatively, based on input received via a user input device such as a keyboard, touch-screen, voice-recognition subsystem, etc.)

The radiofrequency transceiver (e.g. RF chip 170) on the wireless communications device 100 then transmits the subscription-suspension message to a presence service to suspend the subscription. Specifically, the subscription-suspension message is transmitted over the air to a base station tower that passes the suspension message to the relay which, in turn, communicates the suspension message to the proxy node for forwarding, in turn, to the function node. As noted above, the function node processes the message, identifies the subscription to be suspended, and then suspends the subscription by rerouting notifications to the persistent data store where they are accumulated for subsequent retrieval when the subscription is resumed. Analogously, a subscription-resumption message can be generated by the device, either in response to manual user input or in response to detection of a triggering condition. The subscription-resumption message, just like the subscription-suspension message, is communicated to the function node via the base station, relay and proxy node.

Methods

Figure 33:
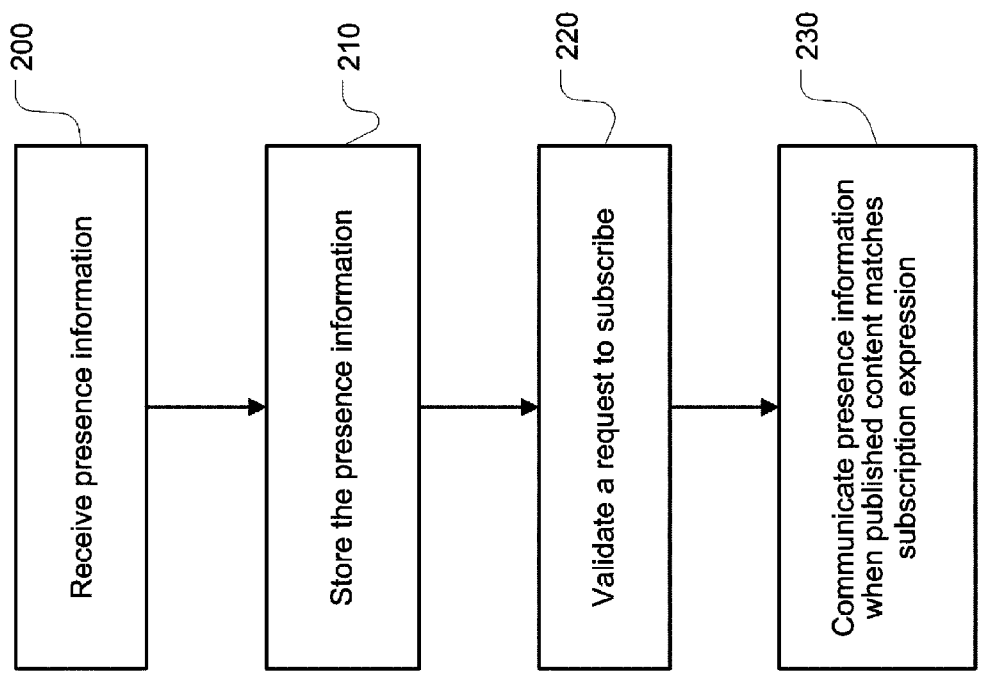
FIG. 33 is a flowchart depicting some of the main steps of a method of disseminating presence information.

FIG. 33 is a flowchart outlining some of the main steps of an exemplary method of providing presence information about a first user to a second user, the method comprising a step 200 of receiving presence information published from a presence client associated with the first user, a step 210 of storing the presence information in any arbitrary data format, a step 220 of validating a request to subscribe to the presence information associated with the first user by determining if the second user has been authorized by the first user to subscribe to the presence information, and a step 230 of communicating the one or more elements of the presence information to a presence client associated with the second user when content requested by the second user matches content published by the first user.

In one implementation of this method, the act of validating the request to subscribe entails an act of determining which one or more of a plurality of elements of presence information the first user has authorized the second user to receive. In other words, the first user (the one who publishes his presence information) may authorize the second user to obtain all the presence information that he publishes or merely a subset of this information. In one implementation, the first user may authorize the second user to receive (watch) only certain attributes (elements) of the presence information while restricting access to other attributes. For example, the first user may allow the second user to be notified of the first user's mood and availability but not his location.

In a variant of this implementation, the user may define a set of conditions (e.g. time of day, location, mood, availability) that determine how much access the second user (watcher) may be granted. For example, the first user may specify that the second user may receive presence information pertaining to his mood and availability provided that the time of day is outside of normal working hours and that the location of the second user is within a certain radius of the first user.

In this manner, the first user may set up a highly nuanced set of conditions (in, for example, a watcher profile for the second user) that modulates the access to the presence information. The watcher profile may be statically defined (a set of specified conditions that the first user affirmatively stipulates) or dynamically defined (the conditions may change based on the first user's own presence information, e.g. location, mood, activity, etc., or based on the second user's presence information, or based on a combination of the first and second user's presence information). In like manner, the second user may also define his subscriptions using the same or similar sets of conditions to ensure that presence information is only received for elements/attributes of interest at times when these are relevant or meaningful to the second user (the watcher). This dynamic interaction between the published presence information and the subscription enables users of the presence system to interact much more efficiently than was heretofore possible using the rudimentary presence and rich presence technologies currently known in the art.

Furthermore, in one implementation of the novel presence system, each attribute (each element of presence information) is encrypted separately using a different key so that specific attributes can be shared individually and privately. Keys can be exchanged securely using Diffie-Hellman to one or more authorized watchers for each specific attribute for which an authorization has been granted. This represents a radically different privacy paradigm from what is proposed in RFC 3863 wherein presence information is instantiated as a single monolithic document. If a Presentity wants to apply privacy rules that result in a watcher being permitted to receive only a subset of the presence information then a new document must be created which does not contain private information. This requires filtering of the presence information to remove private data. Filtering would be required for each notification cycle and for each watcher, and then the entire presence document is sent to the watcher even if this contains potentially unneeded information. This is particularly inefficient for mobile clients. In contrast, the novel presence system described herein can encrypt each attribute separately and send only that attribute to the watcher while maintaining complete privacy for all other attributes.

Figure 34:
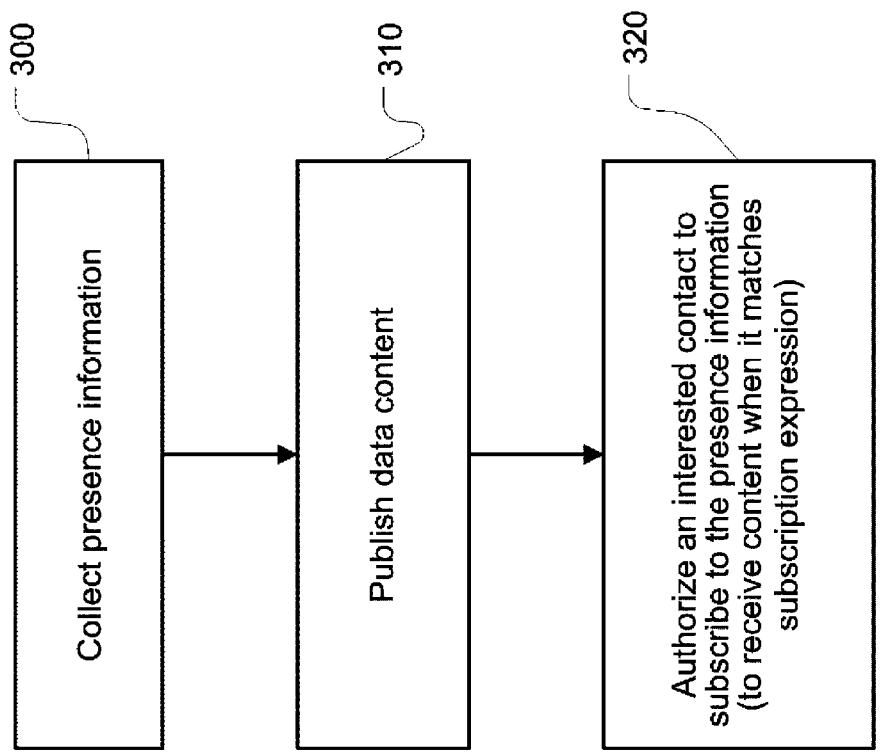
FIG. 34 is a flowchart depicting some of the main steps of a method of publishing presence information.

FIG. 34 is a flowchart depicting some of the main steps of a method of publishing presence information. This method of publishing presence information involves collecting presence information (step 300), publishing data content representing presence information to a content-based presence service, the presence service storing the data content in any arbitrary data format (step 310) and then authorizing an interested contact to subscribe to the presence information, thereby defining the contact as a watcher, the watcher receiving the data content representing the presence information when a subscription expression specified by the watcher matches the data content published to the presence service (step 320).

Figure 35:
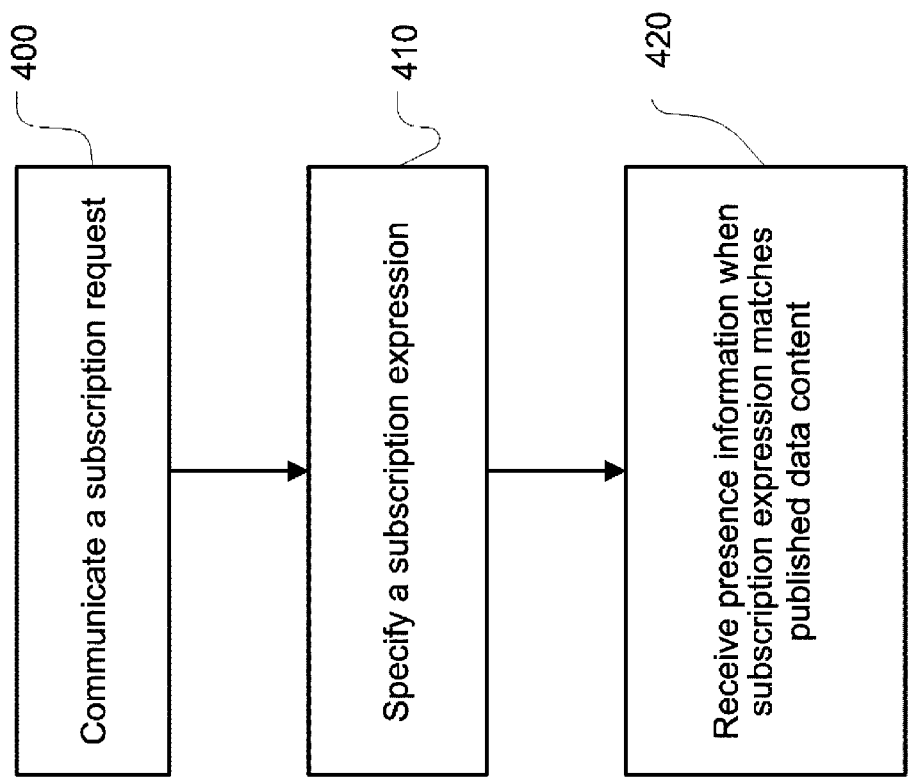
FIG. 35 is a flowchart depicting some of the main steps of a method of subscribing to presence information.

FIG. 35 is a flowchart depicting some of the main steps of a method of subscribing to presence information. As depicted, this method of subscribing to presence information involves a step 400 of communicating a subscription request to a content-based presence service, the subscription request being validated by the presence service provided that a first user publishing data content representing its presence information has authorized a second user communicating the subscription request to receive this presence information, a step 410 of specifying a subscription expression defining data content that is of interest to the second user, and a step 420 of receiving presence information about the first user when the subscription expression matches the data content published by the first user to the presence service.

Figure 36:
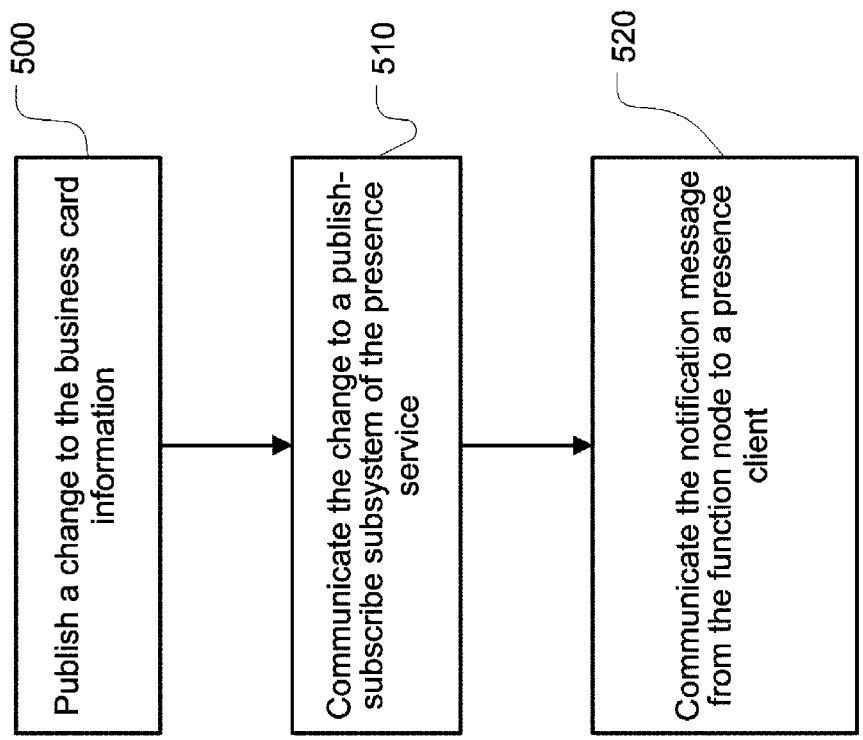
FIG. 36 is a flowchart depicting some of the main steps of a method of updating business card information.

FIG. 36 is a flowchart depicting some of the main steps of a method of updating business card information. This method of automatically updating business card information about a first user on a device associated with a second user involves a step 500 of publishing a change to the business card information by sending a message from a presence client associated with the first user via a proxy node of a presence service to a predetermined function node of the presence service that has already been bound to the presence client of the first user, a step 510 of communicating the change to a publish-subscribe subsystem of the presence service, the publish-subscribe subsystem determining that the second user has a subscription to the business card information of the first user and then notifying the function node of the change in a notification message, and a step 520 of communicating the notification message from the function node to a presence client associated with the second user via a predetermined proxy node.

Figure 37:
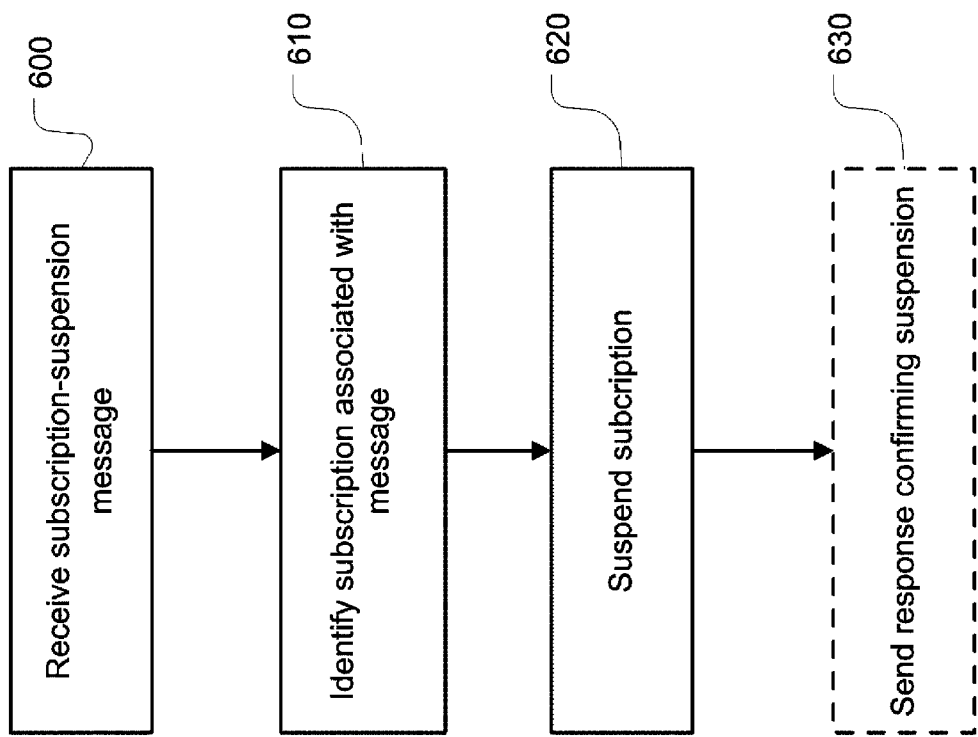
FIG. 37 is a flowchart depicting some of the main steps of a method, performed by the presence service, of managing a subscription.
Figure 38:
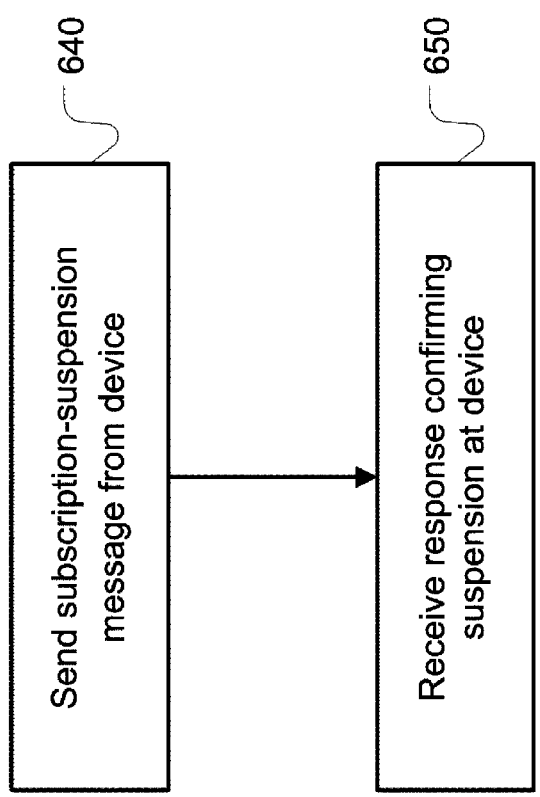
FIG. 38 is a flowchart depicting some of the main steps of a method managing a subscription from a wireless communications device.

FIGS. 37 and 38 summarize the novel methods of subscription management that were described in detail above. FIG. 37 presents the subscription management method from the perspective of the presence service whereas FIG. 38 presents the subscription management method from the perspective of the device (i.e. a wireless communications device or other computing device associated with or operated by a watcher).

FIG. 37 is a flowchart depicting some of the main steps of a novel method, which is performed by the presence service, for managing a subscription to content-based presence information. This novel method entails a step 600 of receiving a subscription-suspension message from a device (e.g. a wireless communications device) at a presence service. The method entails a subsequent step 610 of identifying the subscription associated with the subscription-suspension message and then (at step 620) suspending the subscription. At step 630, a response is sent from the presence service to the device to notify the device that the subscription has been suspended.

FIG. 38 is a flowchart depicting some of the main steps of a novel method, which is performed by a computing device, wireless communications device or the like, for managing a subscription. This method involves a first step 640 of sending a subscription-suspension message from the device to a presence service to suspend the subscription and a subsequent step 650 of receiving a response from the presence service notifying that the subscription has been suspended.

The methods disclosed in the present specification can be implemented as coded instructions in a computer program product or computer readable medium. In other words, the computer program product or computer-readable medium stores software code to perform the foregoing methods when loaded into memory and executed on the microprocessor of one or more computing devices.

This new technology has been described in terms of specific implementations and configurations which are intended to be exemplary only. Persons of ordinary skill in the art will appreciate that variations, modifications and refinements may be made to the technology disclosed herein without departing from the inventive concept(s). The scope of the exclusive right sought is therefore intended to be limited solely by the appended claims.

The invention claimed is:

1. A method performed by a presence service, comprising:
receiving presence information from a presentity;
storing the presence information in any arbitrary data format;

receiving a subscription request from a device, the subscription request including a subscription expression and requesting to establish a subscription to receive the presence information if the presence information matches the subscription expression;

validating the subscription request by determining if the requested presence information is authorized by the presentity from which the presence information is received;

creating the subscription in response to the requested presence information is authorized by the presentity; and communicating the presence information when the presence information matches the subscription expression;

receiving a subscription-suspension message from the device;

identifying the subscription associated with the subscription-suspension message; and suspending the subscription.

2. The method as claimed in claim 1 further comprising sending a response from the presence service to the device to notify the device that the subscription has been suspended.

3. The method as claimed in claim 1 wherein suspending the subscription comprises accumulating notifications in a persistent data store.

4. The method as claimed in claim 3 wherein accumulating notifications comprises:

receiving notifications at a presence function node from a publish-message subsystem; and forwarding the notifications to the persistent data store for storage until the subscription is resumed.

5. The method as claimed in claim 1 further comprising receiving a subscription-resumption message at the presence service to resume the subscription that was suspended.

6. The method as claimed in claim 5 further comprising fetching accumulated notifications from the persistent data store.

7. A presence system comprising:
one or more processors;
a non-transitory computer-readable medium;
software code stored on the non-transitory computer-readable medium and including instructions that are executable on the one or more processors to:
receive presence information from a presentity; and
store the presence information in any arbitrary data format;

receive a subscription request from a device, the subscription request including a subscription expression and requesting to establish a subscription to receive the presence information if the presence information matches the subscription expression;

validate the subscription request by determining if the requested presence information is authorized by the presentity from which the presence information is received;

create the subscription in response to the requested presence information is authorized by the presentity; and communicate the presence information when the presence information matches the subscription expression;

receive a subscription-suspension message from the device;

identify the subscription associated with the subscription-suspension message; and suspend the subscription.

8. The presence system as claimed in claim 7 wherein the instructions are further configured to send a response from the presence service to the device to notify the device that the subscription has been suspended.

9. The presence system as claimed in claim 7 wherein suspending the subscription comprises accumulating notifications in a persistent data store.

10. The presence system as claimed in claim 9 wherein accumulating notifications comprises:

receiving notifications at a presence function node from a publish-message subsystem; and forwarding the notifications to the persistent data store for storage until the subscription is resumed.

11. The presence system as claimed in claim 7 wherein the instructions are further configured to receive a subscription-resumption message at the presence service to resume the subscription that was suspended.

12. The presence system as claimed in claim 11 wherein the instructions are further configured to fetch accumulated notifications from the persistent data store.

* * * * *